(12) United States Patent
Neubauer et al.

(10) Patent No.: US 8,318,257 B2
(45) Date of Patent: Nov. 27, 2012

(54) DISPERSIONS OF HIGHER CRYSTALLINITY OLEFINS

(75) Inventors: Anthony C. Neubauer, Piscataway, NJ (US); Albert Quaranta, Sayreville, NJ (US); Neil W. Dunchus, Kinnelon, NJ (US); Matthew J. Kalinowski, Freeland, MI (US); Gary M. Strandburg, Mount Pleasant, MI (US); Kevin D. Maak, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 265 days.

(21) Appl. No.: 12/680,502

(22) PCT Filed: Sep. 18, 2008

(86) PCT No.: PCT/US2008/076758
§ 371 (c)(1),
(2), (4) Date: Mar. 26, 2010

(87) PCT Pub. No.: WO2009/045731
PCT Pub. Date: Apr. 9, 2009

(65) Prior Publication Data
US 2010/0255207 A1 Oct. 7, 2010

Related U.S. Application Data

(60) Provisional application No. 60/976,255, filed on Sep. 28, 2007.

(51) Int. Cl.
*B05D 3/02* (2006.01)

(52) U.S. Cl. .................. 427/384; 427/385.5; 427/388.1; 427/388.4; 427/389.9; 427/393.5; 427/394

(58) Field of Classification Search .................. None
See application file for complete search history.

(56) References Cited

U.S. PATENT DOCUMENTS

| | | | |
|---|---|---|---|
| 3,585,104 A | 6/1971 | Kleinert | |
| 3,645,992 A | 2/1972 | Elston | |
| 4,076,698 A | 2/1978 | Anderson et al. | |
| 4,594,130 A | 6/1986 | Chang et al. | |
| 4,599,392 A | 7/1986 | McKinney et al. | |
| 4,775,713 A | 10/1988 | Homma et al. | |
| 4,793,898 A | 12/1988 | Laamanen et al. | |
| 4,970,258 A | 11/1990 | Homma et al. | |
| 4,988,781 A | 1/1991 | McKinney et al. | |
| 5,130,371 A | 7/1992 | Fujita et al. | |
| 5,272,236 A | 12/1993 | Lai et al. | |
| 5,278,272 A | 1/1994 | Lai et al. | |
| 5,504,172 A | 4/1996 | Imuta et al. | |

(Continued)

FOREIGN PATENT DOCUMENTS

GB 965 626 A 8/1964

(Continued)

OTHER PUBLICATIONS

Communication pursuant to Article 94(3) EPC issued Sep. 10, 2010 in corresponding EPO Application No. 08 835 679.5 (5 pages).

(Continued)

*Primary Examiner* — Erma Cameron

(57) ABSTRACT

Dispersions and methods for forming dispersions that include a higher crystallinity polyolefin and at least one dispersing agent are disclosed. Various applications for use of the dispersions are also disclosed.

17 Claims, 5 Drawing Sheets

U.S. PATENT DOCUMENTS

| | | | |
|---|---|---|---|
| 5,595,628 | A | 1/1997 | Gordon et al. |
| 5,677,383 | A | 10/1997 | Chum et al. |
| 5,756,659 | A | 5/1998 | Hughes et al. |
| 5,844,045 | A | 12/1998 | Kolthammer et al. |
| 5,869,575 | A | 2/1999 | Kolthammer et al. |
| 5,938,437 | A | 8/1999 | DeVincenzo |
| 6,111,023 | A | 8/2000 | Chum et al. |
| 6,316,549 | B1 | 11/2001 | Chum et al. |
| 6,423,183 | B1 | 7/2002 | Goulet et al. |
| 6,448,341 | B1 | 9/2002 | Kolthammer et al. |
| 6,455,636 | B2 | 9/2002 | Sanada |
| 6,512,024 | B1 | 1/2003 | Lundgard et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 6,767,956 | B2 | 7/2004 | Choudhery |
| 6,824,650 | B2 | 11/2004 | Lindsay et al. |
| 6,837,970 | B2 | 1/2005 | Ko et al. |
| 6,863,940 | B2 | 3/2005 | Silver et al. |
| 7,157,531 | B2 | 1/2007 | Szul et al. |
| 7,528,080 | B2 | 5/2009 | Prieto et al. |
| 2002/0013397 | A1 | 1/2002 | Kawamura et al. |
| 2003/0176564 | A1* | 9/2003 | Choudhery et al. .......... 524/503 |
| 2004/0149412 | A1 | 8/2004 | Tammi et al. |
| 2005/0100754 | A1 | 5/2005 | Monica et al. |
| 2005/0192365 | A1 | 9/2005 | Strandburg et al. |
| 2005/0192402 | A1 | 9/2005 | Antal et al. |
| 2005/0271888 | A1 | 12/2005 | Moncla et al. |
| 2007/0243481 | A1 | 10/2007 | Klier et al. |
| 2008/0200891 | A1 | 8/2008 | Kim et al. |
| 2008/0234435 | A1 | 9/2008 | Chang et al. |
| 2008/0262175 | A1 | 10/2008 | Arriola et al. |
| 2008/0269419 | A1 | 10/2008 | Hustad |
| 2008/0295985 | A1 | 12/2008 | Moncla et al. |
| 2009/0111944 | A1 | 4/2009 | Kuhlman et al. |

FOREIGN PATENT DOCUMENTS

| | | |
|---|---|---|
| GB | 965626 | 8/1964 |
| WO | 0001745 A1 | 1/2000 |
| WO | 01/64774 A2 | 9/2001 |
| WO | 2005/008917 A1 | 1/2005 |
| WO | 2005/021622 A2 | 3/2005 |
| WO | 2005/021638 A2 | 3/2005 |
| WO | 2005/090425 A1 | 9/2005 |
| WO | 2005/090427 A2 | 9/2005 |
| WO | 2005085331 A1 | 9/2005 |

OTHER PUBLICATIONS

Polimeri Europa: "Technical Data Sheet Eraclene MS 809" Jun. 2006 (2 pages).

Menges G.: "Werkstoffkunde Kunststoffe" 1990, Carl Hanser Verlag, Munchen ISBN: 3-446-15612-7, p. 16, 42 (2 pages).

Amendment to Claims After Search Report for counterpart EP Patent Application No. 08835679.5, dated Jun. 9, 2010, 6 pages.

Amendment to Claims Before Examination for counterpart EP Patent Application No. 08835679.5, dated Mar. 17, 2011, 12 pages.

Singaporean Search Report dated Jul. 15, 2011 from counterpart Singaporean Application No. 201002111-1, 2 pages.

European Search Report dated Sep. 1, 2011 from counterpart European Application No. 08835679.5, 5 pages.

International Search Report issued in PCT/US2008/076758, mailed on Apr. 24, 2009, 6 pages.

Written Opinion issued in PCT/US2008/076758, mailed on Apr. 24, 2009, 6 pages.

Gulf Cooperation Council Office Action dated May 1, 2011 from counterpart GCC Application No. GCC/P/2008/11811, 5 pages.

Gulf Cooperation Council Response to Office Action dated Jul. 3, 2011 from counterpart GCC Application No. GCC/P/2008/11811, 5 pages.

English Translation of Chinese Office Action for counterpart Chinese Patent Application No. 200880118270.5, dated Dec. 23, 2011, 1 page.

Chinese Response to Office Action dated May 7, 2012 for counterpart Chinese Application No. 200880118270.5.

European Response to Examination Report dated Feb. 21, 2012 for counterpart EP Application No. 08835679.5.

Response to EPO Office Action dated Feb. 21, 2012 for counterpart EPO Application No. 08835679.5, 3 pages.

Joao B. Soares et al., "Crystallization Analysis Fractionation," Journal of Polymer Science Part B: Polymer Physics, vol. 43, No. 13, pp. 1557-1570 (Jul. 2005).

Yury V. Kissin et al., Journal of Applied Polymer Science, vol. 106, No. 6, pp. 3872-3883 (Dec. 15, 2007).

Singapore Response to Written Opinion for counterpart Singapore Application No. 201002111-1, Apr. 16, 2012.

Taiwan Office Action dated Aug. 7, 2012; from counterpart TW application No. 97137182.

* cited by examiner

DISPERSIONS OF HIGHER CRYSTALLINITY OLEFINS

BACKGROUND OF INVENTION

1. Field of the Invention

The invention relates generally to dispersions of olefins.

2. Background

Aqueous dispersions of a thermoplastic resin of various types are known in the art and have been used in a wide variety of fields. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability. An aqueous medium is advantageous compared to an organic dispersion medium in view of common hazards such as flammability, working environment, handling convenience, and the like.

Conventional aqueous dispersions of a thermoplastic resin have been produced either by a process wherein a polymerizable monomer which is the resin raw material is polymerized by emulsion polymerization in an aqueous medium in the presence of a dispersing agent, or by a process wherein a molten thermoplastic resin and an aqueous medium, and optionally a dispersing agent are mixed by applying shearing force.

Until the advent of polyolefin dispersions, polyolefins were typically limited to extrusion and coextrusion processes and thus polyolefins could not be used in coating processes such as paper coating, fabric coating, and the like, nor in very thin layers, e.g., less than 15 microns.

Newer polyolefin dispersions have provided improved performance, but the useful polyolefin dispersions have been limited to those with lower crystallinities, such as ethylene and propylene elastomers and plastomers. Exemplary aqueous dispersions of this sort are disclosed in U.S. Patent Application Publication No. 2005/0100754, which is assigned to the assignee of the present invention. Alternatively, higher crystallinity polyolefins have been dispersed in water, but have required the presence of solvents.

Accordingly, there exists a need for dispersions and foams formed from higher crystallinity thermoplastic polymers, especially olefin-based polymers, where the dispersions are preferably formed without the use of solvents.

SUMMARY OF INVENTION

In one aspect, embodiments disclosed herein relate to aqueous dispersions including: at least one higher crystallinity thermoplastic; at least one dispersing agent; and water.

In another aspect, embodiments disclosed herein relate to a method of forming an aqueous dispersion, including: melt kneading (A) at least one higher crystallinity polyolefin, and (B) at least one stabilizing agent, to produce a melt-kneaded product; diluting the melt-kneaded product with water; and melt kneading the resulting mixture to form the dispersion.

In another aspect, embodiments disclosed herein relate to a method of forming a foam, including: contacting the dispersion of claim 1 with air or other inert gas to form a whipped dispersion; depositing the whipped dispersion onto a substrate; and at least partially drying the whipped dispersion to form a foam, wherein the whipped dispersion is formed at a temperature less than the melting point of the dispersed polymer.

In another aspect, embodiments disclosed herein relate to a cellulose-based article including: a cellulose-based composition; and an applied compound, wherein the applied compound, at the time of application, comprises an aqueous dispersion including: a higher crystallinity polyolefin; and at least one dispersing agent.

In another aspect, embodiments disclosed herein relate to articles formed by a process including: impregnating a fibrous structure with a compound, the compound comprising an aqueous dispersion, the dispersion comprising a higher crystallinity polyolefin; and at least one dispersing agent, removing at least a portion of the water from the impregnated fibrous structure.

In another aspect, embodiments disclosed herein relate to coated fibers including: a compound in contact with a portion of a fiber, wherein the compound at the time of contacting comprised an aqueous dispersion comprising: a higher crystallinity polyolefin; and at least one dispersing agent, wherein the fiber has a diameter between 5 and 35 microns; and wherein a thickness of a coating layer of the compound on the fiber ranges from about 0.1 to 10 microns.

In another aspect, embodiments disclosed herein relate to a toner composition including: a particulate made from an aqueous dispersion, the dispersion comprising: a higher crystallinity polyolefin; and at least one dispersing agent, and at least one selected from the group consisting of a colorant and a magnetic pigment, wherein the dispersion has an average volume diameter particle size from about 0.3 to about 8 microns, wherein the dispersion has at least been partially dried such that the liquid level is at least 50 percent that of the liquid level of the dispersion to form the particulate.

In another aspect, embodiments disclosed herein relate to a method for forming a layer on a substrate comprising: applying an aqueous dispersion to a substrate, the dispersion comprising: a higher crystallinity polyolefin; at least one dispersing agent; removing at least a portion of water in the dispersion to form a first layer.

In another aspect, embodiments disclosed herein relate to a method to make a long fiber concentrate comprising fibers and a thermoplastic resin comprising the steps of: i) coating continuous fibers with an aqueous dispersion to form thermoplastic coated continuous fiber strands, wherein the dispersion comprises: a higher crystallinity polyolefin and at least one dispersing agent; ii) heating the thermoplastic coated continuous fiber strands, iii) chopping the dried thermoplastic coated continuous fiber strands forming dried long fiber concentrate pellets, and iv) isolating dried long fiber concentrate pellets.

In another aspect, embodiments disclosed herein relate to a method to make a long fiber concentrate comprising fibers and a thermoplastic resin comprising the steps of: i) coating chopped long fibers with an aqueous dispersion to form thermoplastic coated chopped fiber pellets, wherein the dispersion comprises a higher crystallinity polyolefin and at least one dispersing agent; ii) heating the coated chopped long fiber concentrate pellets, and iii) isolating dried long fiber concentrate pellets.

Other aspects and advantages of the invention will be apparent from the following description and the appended claims.

DETAILED DESCRIPTION

Figure 1:
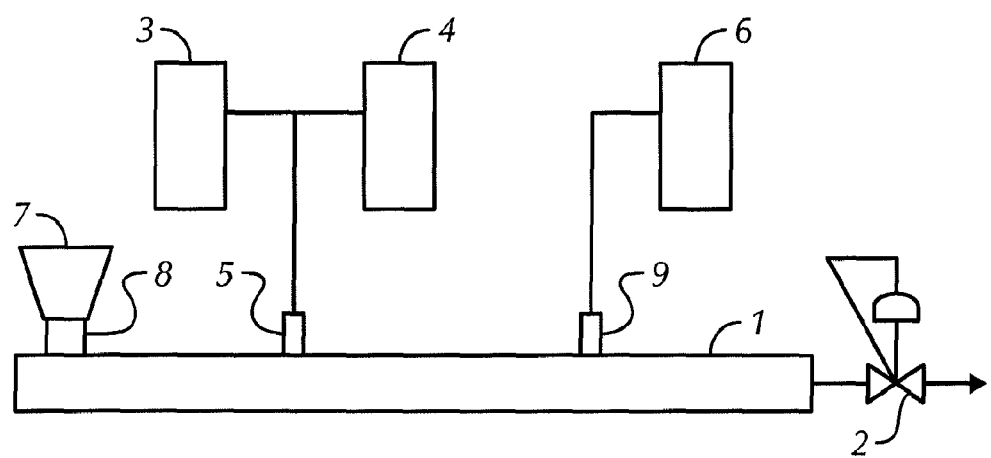
FIG. 1 is a schematic representation of a typical melt-extrusion apparatus used to prepare embodiments of the invention.

As used herein, the term "higher crystallinity thermoplastic," preferably a polyolefin means a thermoplastic having a crystallinity of at least 46% and, preferably a density greater than or equal to 0.915 g/cc. As used herein, the term "lower crystallinity thermoplastic," preferably a polyolefin, means a thermoplastic having a crystallinity of less than 46%, regardless of density. In various embodiments, higher crystallinity polyolefins may have a density of at least 0.920 g/cc, at least 0.925 g/cc, at least 0.930 g/cc, at least 0.940 g/cc, at least 0.945 g/cc, at least 0.950 g/cc, at least 0.955 g/cc, at least 0.960 g/cc, or at least 0.965 g/cc (density is measured in accordance with ASTM D 792). In other various embodiments, higher crystallinity polyolefins may have a crystallinity of at least 49 percent, at least 50 percent, at least 52 percent, at least 56 percent, at least 62 percent, at least 65 percent, at least 69 percent, at least 72 percent, at least 75 percent or at least 78 percent. Preferably, the higher crystallinity thermoplastics may have weight average molecular weights, $M_w$, for example, ranging from a lower limit of 15,000 g/mole, 30,000 g/mole, preferably 50,000 g/mole to an upper limit of about 5,000,000 g/mole, preferably to about 2,500,000, and especially to about 1,000,000 in some embodiments; from 1000 g/mole to 1,000,000 g/mole in other embodiments; from 10,000 g/mole to 500,000 g/mole in other embodiments; and from 10,000 g/mole to 300,000 g/mole in yet other embodiments. For example, polyolefin polymers having a crystallinity of about 55% and higher with a $M_w$ from about 15,000 to about 1,000,000 g/mole are especially preferred.

Other embodiments disclosed herein relate to an apparatus for forming a polymer dispersion. More specifically, embodiments disclosed herein relate to an extruder or an extrusion system useful for forming polymer dispersions, such as polyolefin dispersions. In another aspect, embodiments disclosed herein relate to a kneading disk useful in an extrusion system for forming polymer dispersions. Apparatuses for forming dispersions herein may be used to produce aqueous (having a water-based dispersion medium) or non-aqueous dispersion (having an oleaginous or hydrocarbon-based dispersion medium).

"Polymer" means a polymeric compound prepared by polymerizing monomers, whether of the same or a different type. The generic term "polymer" embraces the terms "homopolymer," "copolymer," "terpolymer," as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The terms "ethylene/α-olefin interpolymer" and "propylene/α-olefin interpolymer" refer to polymers with ethylene or propylene, respectively, being the majority mole fraction of the whole polymer. In some embodiments, the majority monomer may comprise at least 50 mole percent of the whole polymer; at least 60 mole percent in other embodiments; at least 70 mole percent in other embodiments; and at least 80 mole percent in yet other embodiments. The remainder of the whole polymer comprising at least one comonomer. In some embodiments, ethylene/α-olefin interpolymers include ethylene at a content of greater than about 80 mole percent, and an α-olefin content of equal to or less than about 20 mole percent.

In one aspect, embodiments disclosed herein relate to an aqueous dispersion composition including at least one polyolefin with a density greater than 0.915 g/cc, e.g., LDPE or HDPE homopolymer, ethylene/alpha-olefin LLDPE or HDPE copolymers, PP homopolymer, PP random and impact copolymers, propylene-ethylene copolymers, and a dispersing agent.

More specifically, selected embodiments disclosed that involve a polyethylene component have a melt index ($I_2$ at 190° C.) (melt index is measured in accordance with ASTM D 1238, condition 190C/2.16 kg) ranging from 0.5 dg/min to 30 dg/min. Moreover, in select embodiments the dispersion composition may also include at least one surfactant agent, such as PRIMACOR 59801, at 3 wt % to 50 wt %. Still further, in select embodiments, a neutralizing agent may be used. Specifically, KOH, $NH_4OH$ and NaOH may be used as neutralizing agents and dosed at 50% to 100% neutralization. In select embodiments, the final solids concentration should be between 30% (wt/wt) to 60% (wt/wt).

Embodiments disclosed herein may include mixtures or blends of multiple polymers, so long as at least one of the dispersed polymers is a higher crystallinity olefin. For example, it is specifically within the scope of the present disclosure that dispersions of higher crystallinity olefins may be blended with dispersions of lower crystallinity olefins. Similarly, multiple different higher crystallinity olefins and/or multiple different lower crystallinity olefins may be used in conjunction with each other.

Polyolefins

In specific embodiments, the thermoplastic polymers or non-polar thermoplastic polyolefins may include polyolefins such as polypropylene, polyethylene, and copolymers thereof, and blends thereof, as well as ethylene-propylene-diene terpolymers. In some embodiments, preferred olefinic polymers include homogeneous polymers described in U.S. Pat. No. 3,645,992; high density polyethylene (HDPE) as described in U.S. Pat. No. 4,076,698; homogeneously branched, linear ethylene/α-olefin copolymers; homogeneously branched, substantially linear ethylene/α-olefin polymers, which may be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, are also suitable in some embodiments. Of course, blends of polymers may be used as well. In some embodiments, the blends include two different Ziegler-Natta polymers. In other embodiments, the blends may include blends of a Ziegler-Natta and a metallocene polymer. In still other embodiments, the polymer used herein may be a blend of two different metallocene polymers. In other embodiments polymers produced from single site catalysts may be used. In yet another embodiment, block or multi-block copolymers may be used in embodiments of the invention. Such polymers include those described and claimed in WO2005/090427 (having priority to U.S. Ser. No. 60/553,906, filed Mar. 7, 2004).

Thus, in select embodiments, exemplary polymers include polypropylene (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS).

In some particular embodiments, the polymer is a propylene-based copolymer or interpolymer. In some embodiments, the propylene-based copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the thermoplastic polymer may be ethylene vinyl acetate (EVA) based polymers. In other embodiments, the thermoplastic polymer may be ethylene-methyl acrylate (EMA) based polymers. In other particular embodiments, the ethylene-α olefin copolymer may be ethylene-butene, ethylene-hexene, or ethylene-octene copolymers or interpolymers. In other particular embodiments, the propylene-α olefin copolymer may be a propylene-ethylene or a propylene-ethylene-butene copolymer or interpolymer.

Dispersions formed in accordance with other embodiments may also include fillers and additives. In addition, embodiments of the present invention may also use multi-block olefin interpolymers having suitable densities and/or crystallinities, as those polymers are described below.

Multi-Block Olefin Interpolymer

As described above, embodiments of the dispersions disclosed herein may include a polymeric component that may include at least one multi-block olefin interpolymer. The following definitions are provided to distinguish a multi-block olefin interpolymer from other olefin polymers.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The multi-block copolymers are characterized by unique distributions of polydispersity index (PDI or WM.), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1 to about 2.9; from about 1.3 to about 2.5 in other embodiments; from about 1.4 to about 2 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block interpolymers (hereinafter "ethylene/α-olefin interpolymer" or variations thereof) comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

In other embodiments, the block copolymers do not have a third block. In still other embodiments, neither block A nor block B comprises two or more segments (or sub-blocks), such as a tip segment.

The ethylene/α-olefin interpolymers are characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF (temperature rising elution fractionation) from 20° C. and 110° C., with an increment of 5° C.:

$$ABI = \Sigma(w_i BI_i)$$

where $BI_i$ is the block index for the $i^{th}$ fraction of the ethylene/α-olefin interpolymer obtained in preparative TREF, and $w_i$ is the weight percentage of the $i^{th}$ fraction.

Similarly, the square root of the second moment about the mean, hereinafter referred to as the second moment weight average block index, may be defined as follows:

$$2^{nd} \text{ moment weight average } BI = \sqrt{\frac{\Sigma(w_i(BI_i - ABI)^2)}{\frac{(N-1)\Sigma w_i}{N}}}$$

For each polymer fraction, BI is defined by one of the two following equations (both of which give the same BI value):

$$BI = \frac{1/T_x - 1/T_{XO}}{1/T_A - 1/T_{AB}} \text{ or } BI = -\frac{LnP_X - LnP_{XO}}{LnP_A - LnP_{AB}}$$

where $T_X$ is the analytical temperature rising elution fractionation (ATREF) elution temperature for the $i^{th}$ fraction (preferably expressed in Kelvin), $P_X$ is the ethylene mole fraction for the $i^{th}$ fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

ti $Ln P_{AB} = \alpha/T_{AB} + \beta$ where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$Ln P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $LnP_X = \alpha/T_{XO} + \beta$ Conversely, $P_{XO}$ is the ethylene mole fraction for a random copolymer of the same composition and having an ATREF temperature of $T_X$, which may be calculated from $Ln P_{XO} = \alpha/T_X + \beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the ethylene/α-olefin interpolymer is that the ethylene/α-olefin interpolymer comprises at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

In addition to an average block index and individual fraction block indices, the ethylene/α-olefin interpolymers may be characterized by one or more of the properties described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$T_m > -2002.9 + 4538.5(d) - 2422.2(d)^2$ in some embodiments;

$T_m \geq -6288.1+13141(d)-6720.3(d)^2$ in other embodiments; and $T_m \geq 858.91-1825.3(d)+1112.8(d)^2$ in yet other embodiments.

Unlike the traditional random copolymers of ethylene/α-olefins whose melting points decrease with decreasing densities, the ethylene/α-olefins interpolymers exhibit melting points substantially independent of the density, particularly when density is between about 0.87 Wee to about 0.95 g/cc. For example, the melting point of such polymers may be in the range of about 110° C. to about 130° C. when density ranges from 0.875 g/cc to about 0.945 g/cc. In some embodiments, the melting point of such polymers may be in the range of about 115° C. to about 125° C. when density ranges from 0.875 g/cc to about 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

ΔT>−0.1299(ΔH)+62.81 in some embodiments;
ΔT≧−0.1299(ΔH)+64.38 in other embodiments; and
ΔT≧−0.1299(ΔH)+65.95, in yet other embodiments, for ΔH up to 130 J/g. Moreover, ΔT is equal to or greater than 48° C. for ΔH greater than 130 Jig. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers may have a molecular fraction which elutes between 40° C. and 130° C. when fractionated using Temperature Rising Elution Fractionation ("TREF"), characterized in that the fraction has a molar comonomer content higher, at least 5 percent higher in some embodiments, at least 10 percent higher in other embodiments, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. In some embodiments, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

Re>1481−1629(d) in some embodiments;
Re≧1491−1629(d) in other embodiments;
Re≧1501−1629(d) in other embodiments; and
Re≧1511−1629(d) in yet other embodiments.

In some embodiments, the ethylene/α-olefin interpolymers may have a tensile strength above 10 MPa; a tensile strength greater than 11 MPa in other embodiments; and a tensile strength greater than 13 MPa in yet other embodiments. In some embodiments, the ethylene/α-olefins interpolymers may have an elongation at break of at least 600 percent at a crosshead separation rate of 11 cm/minute; at least 700 percent in other embodiments; at least 800 percent in other embodiments; and at least 900 percent in yet other embodiments.

In some embodiments, the ethylene/α-olefin interpolymers may have a storage modulus ratio, G'(25° C.)/G'(100° C.), from 1 to 50; from 1 to 20 in other embodiments; and from 1 to 10 in yet other embodiments. In some embodiments, the ethylene/α-olefin interpolymers may have a 70° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have an 85° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have a heat of fusion of less than 85 J/g. In other embodiments, the ethylene/α-olefin interpolymer may have a pellet blocking strength of equal to or less than 100 pound/ft² (4800 Pa); equal to or less than 50 lb/ft² (2400 Pa) in other embodiments; equal to or less than 5 lb/ft² (240 Pa), and as low as 0 lb/ft² (0 Pa) in yet other embodiments.

In other embodiments, the ethylene/α-olefin interpolymers may comprise, in polymerized form, at least 50 mole percent ethylene and have a 70° C. compression set of less than 80 percent; less than 70 percent in other embodiments; less than 60 percent in other embodiments; and, less than 50 percent, less than 40 percent, and down to a compression set of 0 percent in yet other embodiments.

In some embodiments, the multi-block copolymers may possess a PDI fitting a Schultz-Flory distribution rather than a Poisson distribution. The copolymers may be further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the block interpolymers may have additional characteristics or properties. In one aspect, the interpolymers, preferably comprising ethylene and one or more co-polymerizable comonomers in polymerized form, are characterized by multiple blocks or segments of two or more polymerized monomer units differing in chemical or physical properties (blocked interpolymer), most preferably a multi-block copolymer, the block interpolymer having a molecular fraction which elutes between 40° C. and 130° C. when fractionated using TREF, characterized in that the fraction has a molar comonomer content higher, at least 5 percent higher in some embodiments, at least 10 percent higher in other embodiments, than that of a comparable random ethylene interpolymer fraction eluting between the same temperatures, wherein the comparable random ethylene interpolymer comprises the same comonomer(s), and has a melt index, density, and molar comonomer content (based on the whole polymer) within 10 percent of that of the blocked interpolymer. The Mw/Mn of the comparable interpolymer may also be within 10 percent of that of the blocked interpolymer and/or the comparable interpolymer may have total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, the block interpolymers have at least one such fraction having a higher molar comonomer content than a corresponding fraction of the comparable interpolymer.

Comonomer content may be measured using any suitable technique, with techniques based on nuclear magnetic resonance (NMR) spectroscopy preferred. Using this technique, the blocked interpolymers have higher molar comonomer content than a corresponding comparable interpolymer.

In some embodiments, for interpolymers of ethylene and 1-octene, the block interpolymer may have a comonomer content of the TREF fraction eluting between 40 and 130° C. greater than or equal to the quantity $(-0.2013)*T+20.07$, where T is the numerical value of the peak elution temperature of the TREF fraction being compared, measured in ° C. The comonomer content of the TREF fraction eluting between 40 and 130° C. may be greater than or equal to the quantity $(-0.2013)*T+21.07$ in other embodiments The interpolymers having the higher crystallinities may especially have higher weight average molecular weights, $M_w$, for example, ranging from a lower limit of 15,000 g/mole, 30,000 g/mole, preferably 50,000 g/mole to an upper limit of about 5,000,000 g/mole, preferably to about 2,500,000, and especially to about 1,000,000 in some embodiments; from 1000 g/mole to 1,000,000 g/mole in other embodiments; from 10,000 g/mole to 500,000 g/mole in other embodiments; and from 10,000 g/mole to 300,000 g/mole in yet other embodiments. For example, polyolefin polymers having a crystallinity of about 55% and higher with a $M_w$ from about 15,000 to about 1,000,000 g/mole are especially preferred. In certain embodiments, when using higher crystallinity polyolefins, the density of the ethylene/α-olefin polymers may range from 0.915 g/cm$^3$ to 0.99 g/cm$^3$ or 0.925 g/cm$^3$ to 0.97 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/662,938, filed Mar. 17, 2005; PCT Publication No. WO2005/90425, filed Mar. 17, 2005; PCT Publication No. WO2005/90427, filed Mar. 17, 2005; and PCT Application No. PCT/US2005/008917, filed Mar. 17, 2005, all of which are incorporated by reference herein in their entirety.

Dispersing Agent

Embodiments of the present invention use a dispersing agent (or stabilizing agent) to promote the formation of a stable dispersion or emulsion. In selected embodiments, the stabilizing agent may be a surfactant, a polymer (different from the base polymer detailed above), or mixtures thereof. In certain embodiments, the polymer may be a polar polymer, having a polar group as either a comonomer or grafted monomer. In preferred embodiments, the stabilizing agent comprises one or more polar polyolefins, having a polar group as either a comonomer or grafted monomer. For example, the dispersing agent may include an ethylene/alpha-beta unsaturated carboxylic acid copolymer. In some embodiments, the ethylene/alpha-beta unsaturated carboxylic acid copolymer may include an ethylene-acid copolymer, such as an ethylene-acrylic acid copolymer or an ethylene methacrylic acid copolymer.

Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of Exxon-Mobil) and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other surfactants that may be used include long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the stabilizing polymer may be partially or fully neutralized with a neutralizing agent to form the corresponding salt. In certain embodiments, neutralization of the stabilizing agent, such as a long chain fatty acid or EAA, may be from 25% to 200% on a molar basis; from 50% to 110% on a molar basis in other embodiments. For example, for EAA, the neutralizing agent is a base, such as ammonium hydroxide or potassium hydroxide, for example. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, zwitterionic, or non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In particular embodiments, the dispersing agent or stabilizing agent may be used in an amount ranging from greater than zero to about 60% by weight based on the amount of base polymer (or base polymer mixture) used. For example, long chain fatty acids or salts thereof may be used in an amount ranging from 0.5% to 10% by weight based on the amount of base polymer. In other embodiments, ethylene-acrylic acid or ethylene-methacrylic acid copolymers may be used in an amount from 0.5% to 60% by weight based on polymer. In yet other embodiments, sulfonic acid salts may be used in an amount from 0.5% to 10% by weight based on the amount of base polymer.

The type and amount of stabilizing agent used may also affect end properties of the cellulose-based article formed incorporating the dispersion. For example, articles having improved oil and grease resistance might incorporate a surfactant package having ethylene-acrylic acid copolymers or ethylene-methacrylic acid copolymers in an amount from about 10% to about 50% by weight based on the total amount of base polymer. A similar surfactant package may be used when improved strength or softness is a desired end property. As another example, articles having improved water or moisture resistance might incorporate a surfactant package utilizing long chain fatty acids in an amount from 0.5% to 5%, or ethylene-acrylic acid copolymers in an amount from 10% to 50%, both by weight based on the total amount of base polymer. In other embodiments, the minimum amount of surfactant or stabilizing agent must be at least 1% by weight based on the total amount of base polymer.

Additives

Additives may be used with the base polymer, dispersing agent, or filler used in the dispersion without deviating from the scope of the present invention. For example, additives may include a wetting agent, surfactants, anti-static agents, antifoam agent, anti block, wax-dispersion pigments, a neutralizing agent, a thickener, a compatibilizer, a brightener, a rheology modifier, a biocide, a fungicide, a shear stabilizer, a UV stabilizer, a coefficient of friction modifier, and other additives known to those skilled in the art.

For example, a formulation of the present invention may include surfactants, frothing agents, dispersants, thickeners, fire retardants, pigments, antistatic agents, reinforcing fibers, antifoam agent, anti block, wax-dispersion, antioxidants, a neutralizing agent, a rheology modifier, preservatives, biocides, acid scavengers, a wetting agent, and the like. While optional for purposes of the present invention, other components may be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent may be included in a composition of the present invention at a concentration of at least about 0.5 parts per 100 parts of filler, by weight.

Furthermore, embodiments of the present invention may optionally include a thickener. Thickeners may be useful in the present invention to increase the viscosity of low viscosity dispersions. Thickeners suitable for use in the practice of the present invention may be any known in the art such as for instance poly-acrylate type or associate non ionic thickeners such as modified cellulose ethers. For example, suitable thickeners include ALCOGUM™ VEP-II (trademark of Alco Chemical Corporation), RHEOVIS™ and VISCALEX™ (trademarks of Ciba Geigy), UCAR® Thickener 146, or ETHOCEL™ or METHOCEL™ (trademarks of the The Dow Chemical Company) and PARAGUM™ 241 (trademarks of Para-Chem Southern, Inc.), or BERMACOL™ (trademark of Akzo Nobel) or AQUALON™ (trademark of Hercules) or ACUSOL® (trademark of Rohm and Haas). Thickeners may be used in any amount necessary to prepare a dispersion of desired viscosity.

The ultimate viscosity of the dispersion is, therefore, controllable. Addition of the thickener to the dispersion including the amount of filler may be done with conventional means to result in viscosities as needed. Viscosities of thus dispersions may reach +3000 cP (Brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 cP and 1000 cP (Brookfield viscosity measured at room temperature with spindle RV3 at 50 rpm). Still more preferably, the starting viscosity of the dispersion may be between about 100 to about 600 cP.

Also, embodiments of the present invention are characterized by their stability when a filler is added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain ±10% of the original viscosity over a period of 24 hours, when stored at ambient temperature.

Fillers

Embodiments of the dispersions disclosed herein may include a filler as part of the composition. A suitable filler loading in a polyolefin dispersion may be from about 0 parts to about 600 parts of filler per hundred parts of polyolefin. In certain embodiments, the filler loading in the dispersion may be from about 0 parts to about 200 parts of filler per hundred parts of a combined amount of the polyolefin and the dispersing agent.

The filler material may include conventional fillers such as milled glass, calcium carbonate, aluminum trihydrate, talc, antimony trioxide, fly ash, clays (such as bentonite or kaolin clays for example), titanium dioxide, zeolites, powdered metals, organic or inorganic fibers, including carbon fibers, silicon nitride fibers, steel wire or mesh, and nylon or polyester cording, nano-sized particles, tackifiers, oil extenders, including paraffinic or napthelenic oils, other known fillers.

Those having ordinary skill in the art will recognize that the above list is a non-comprehensive listing of suitable polymers. It will be appreciated that the scope of the present invention is restricted by the claims only.

Dispersion Formulations

Dispersions formed in accordance with embodiments disclosed herein may include a base polymer, which comprises a higher crystallinity polyolefin, and a dispersing agent, which may comprise at least one polar polyolefin. In preferred embodiments, when using an EAA as the dispersing agent, the polymer-to-EAA ratio is preferably between 50:50 to 90:10, and when using fatty acid surfactants as the dispersing agent, the polymer-to-fatty-acid ratio is preferably between 97:3 to 94:6.

With respect to the higher crystallinity polyolefin and the dispersing agent, in some embodiments, the higher crystallinity polyolefin may comprise between about 30 percent to about 99 percent by weight of the total amount of base polymer and dispersing agent in the composition. In other embodiments, the higher crystallinity polyolefin may comprise between about 50 percent and about 90 percent of the total amount of base polymer and dispersing agent in the composition. In yet other embodiments, the higher crystallinity polyolefin may comprise between about 60 percent and about 80 percent of the total amount of base polymer and dispersing agent in the composition.

The higher crystallinity polyolefin may be contained within the aqueous dispersion in an amount from about 1 percent by weight to about 96 percent by weight. In some embodiments, the higher crystallinity polyolefin may be present in the aqueous dispersion in an amount from about 10 percent by weight to about 80 percent by weight. In other embodiments, the higher crystallinity polyolefin may be present in an amount from about 20 percent to about 70 percent by weight; and from about 30 percent to about 60 weight percent by weight in yet other embodiments, Dispersions formed in accordance with embodiments disclosed herein may include a base polymer, which may include a higher crystallinity polyolefin, a secondary polymeric component, which may include at least one lower crystallinity polyolefin, and a dispersing agent. The higher crystallinity polyolefin, in some embodiments, may comprise from about 30 percent to 95 percent by weight of the total amount of base polymer, secondary polymer, and dispersing agent in the composition. In other embodiments, the higher crystallinity polyolefin may comprise between about 50 percent and about 80 percent by weight; and, between about 60 percent to about 70 percent by weight in yet other embodiments. In some embodiments, the secondary polymeric component may comprise from 1 percent to 48 percent by weight of the total amount of base polymer, secondary polymer, and dispersing agent in the composition. In other embodiments, the secondary polymeric component may comprise from 5 to 30 percent by weight; and from 10 percent to 25 percent by weight in yet other embodiments.

Benefits derived from a higher crystallinity polyolefin dispersion may also be realized where the higher crystallinity polyolefin is used as a minority component in a dispersion. Accordingly, dispersions formed in accordance with other embodiments disclosed herein may include a base polymer, which may include a lower crystallinity polyolefin, a secondary polymeric component, which may include a higher crystallinity polyolefin, and a dispersing agent. The base polymer, in some embodiments, may comprise from about 30 percent to 95 percent by weight of the total amount of base polymer, higher crystallinity polyolefin, and dispersing agent in the composition. In other embodiments, the base polymer may comprise between about 50 percent and about 80 percent by weight; and, between about 60 percent to about 70 percent by weight in yet other embodiments. In other embodiments, the higher crystallinity polyolefin component may comprise from 1 percent to 48 percent by weight of the total amount of base polymer, higher crystallinity polyolefin, and dispersing agent in the composition. In other embodiments, the higher crystallinity polyolefin component may comprise from 5 percent to 30 percent by weight; and from 10 percent to 25 percent by weight in yet other embodiments.

With respect to the filler, typically, an amount greater than about 0 parts to about 1000 parts per hundred of the polymer (polymer meaning here the higher crystallinity polyolefin combined with the secondary polymer (if any) and the dispersing agent) is used. In selected embodiments, between about 50 parts to about 250 parts per hundred parts polymer are used. In other selected embodiments, between about 10 parts to about 500 parts per hundred parts polymer are used. In still other embodiments, from between about 20 parts to 400 parts per hundred parts polymer are used. In other embodiments, from about 0 parts to about 200 parts per hundred are used.

The solid materials (higher crystallinity polyolefin plus secondary polymer (if any) plus dispersing agent) are preferably dispersed in water. In preferred embodiments, sufficient neutralizing agent is added to neutralize the resultant dispersion to achieve a pH range of between about 4 to about 14. In preferred embodiments, sufficient base is added to maintain a pH of between about 6 to about 11; in other embodiments, the pH may be between about 8 to about 10.5. Water content of the dispersion is preferably controlled so that the solids content is between about 1% to about 74% by volume. In another embodiment, the solid content is between about 25% to about 74% by volume. In particular embodiments, the solids range may be between about 10% to about 70% by weight. In other particular embodiments, the solids range is between about 20% to about 60% by weight. In particularly preferred embodiments, the solids range is between about 30% to about 55% by weight.

Dispersions formed in accordance with embodiments of the present invention are characterized in having an average particle size from about 0.1 micron to about 5.0 micron. In other embodiments, dispersions have an average particle size from about 0.5 µm to about 2.7 µm. In other embodiments, from about 0.8 µm to about 1.2 µm. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes may be measured on a Beckman-Coulter LS230 laser-diffraction particle size analyzer or other suitable devices, such as the DOWM 102 E06A.

The coatings obtained from dispersions formed in accordance with this disclosure exhibit excellent moisture resistance, water repellency, oil and grease resistance, thermal adhesion to paper and other natural and synthetic substrates such as metal, wood, glass, synthetic fibers and films, and woven and non-woven fabrics.

The aqueous dispersions disclosed herein may be used as coatings, froths, as articles such as foams, and adhesives for bonding and sealing various substrates, especially corrugated boxes and plastics films such as BOPP, polyester and polyamide films. Aqueous dispersion of the present invention may be used for such applications as a binder of a coating or ink composition for a coated paper, paper-board, wall-paper, or other cellulose based article. The aqueous dispersion may be coated by various techniques, for example, by spray coating, curtain coating, coating with a roll coater or a gravure coater, brush coating, or dipping. The coating is preferably dried by heating the coated substrate to 70° C. to 150° C. for 1 sec to 300 sec.

Examples of aqueous dispersions that may be incorporated into the additive composition of the present disclosure are disclosed, for instance, in U.S. Patent Application Publication No. 2005/0100754, U.S. Patent Application Publication No. 2005/0192365, PCT Publication No. WO 2005/021638, and PCT Publication No. WO 2005/021622, which are all incorporated herein by reference.

Some embodiments of the foams formed from the aqueous dispersion disclosed herein may have a compression set value, as defined below, at testing conditions of 80° C., 20 minutes, and 0.5 psig (4.4 kPag), of less than 80 percent. In other embodiments, the foams may have a compression set of less than 70 percent; less than 65 percent in other embodiments; and less than 60 percent in yet other embodiments.

Some embodiments of the foams formed from the aqueous dispersion disclosed herein may have a compression set value, as defined below, at testing conditions of 80° C., 20 minutes, and 0.25 psig (1.7 kPag), of less than 70 percent. In other embodiments, the foams may have a compression set of less than 60 percent; less than 55 percent in other embodiments; and less than 50 percent in yet other embodiments.

Some embodiments of the foams formed from the aqueous dispersion disclosed herein may have a compression set value, as defined below, at testing conditions of 80° C., 20 minutes, and 0.1 psig (0.69 kPag), of less than 60 percent. In other embodiments, the foams may have a compression set of less than 50 percent; less than 45 percent in other embodiments; and less than 40 percent in yet other embodiments.

Forming the Dispersion

The dispersions of the present invention may be formed by any number of methods recognized by those having skill in the art. In selected embodiments, the dispersions may be formed by using techniques, for example, in accordance with the procedures as described in WO2005/021638, which is incorporated by reference in its entirety.

In a specific embodiment, a higher crystallinity polyolefin and a dispersing agent may be melt-kneaded along with water and a neutralizing agent to form a dispersion. Those having ordinary skill in the art will recognize that a number of other neutralizing agents may be used. In some embodiments, the filler may be added after blending the base polymer and dispersing agent. In some embodiments, the dispersion is first diluted to contain about 1% to about 3% by weight water and then, subsequently, further diluted to comprise greater than about 25% by weight water.

Any melt-kneading means known in the art may be used. In some embodiments, a kneader, a BANBURY® mixer, single-screw extruder or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Pat. No. 6,455,636.

Referring now to FIG. 1, a schematic diagram of an extrusion apparatus for manufacturing polymer dispersions is illustrated. An extruder 1, such as a twin screw extruder, may be coupled to a pressure control device 2, such as, but not limited a pressure control valve, a back pressure regulator, a melt pump, a gear pump, and the like. Neutralizing agent reservoir 3 and an initial water reservoir 4, each of which includes a pump (not shown), may also be provided. Desired amounts of neutralizing agent and initial water are provided from the neutralizing agent reservoir 3 and the initial water reservoir 4, respectively. Any suitable pump may be used, but in some embodiments a pump that provides the desired flow at a pressure of 3480 psig (240 bar, 24 MPag) is used to provide the neutralizing agent and the initial water to the extruder 20. In other embodiments, a liquid injection pump provides the required flow at 2900 psig (200 bar, 20 MPag) or at 1930 psig (133 bar, 13.3 MPag). In some embodiments, the neutralizing agent and initial water are preheated in a preheater.

Polymer resin(s), in the form of pellets, powder, or flakes, for example, may be fed from the feeder 7 to an inlet 8 of the extruder 1, where the resin is melted or compounded. The dispersing agent is typically added to the extruder through and along with the resin but may be provided separately to the twin screw extruder 1. The resin melt is then delivered from the mix and convey zone to an emulsification zone of the extruder where the initial amount of water and neutralizing agent from the reservoirs 3 and 4 is added through inlet 5. The emulsified mixture may be further diluted with additional water via inlet 9 from reservoir 6 in a dilution and cooling zone of the extruder 1. Typically, the dispersion is diluted to at least 30 weight percent water in the cooling zone.

In some embodiments, dispersing agent may be added additionally or exclusively to the water stream. In some embodiments, the emulsified mixture is further diluted with additional water inlet 9 from reservoir 6 in a dilution and cooling zone of the extruder 1. Typically, the dispersion is diluted to at least 30 weight percent water in the cooling zone. In addition, the diluted mixture may be diluted any number of times until the desired dilution level is achieved. In some embodiments, water is not added into the twin screw extruder 1 but rather to a stream containing the resin melt after the melt has exited from the extruder Referring now to FIG. 2, a schematic diagram of an extrusion system used in embodiments disclosed herein is illustrated. An extruder 30, such as a twin screw extruder, may be coupled to a control valve 32, for controlling extruder discharge pressure. In some embodiment, control valve 32 may be a V-ball control valve. In other embodiments, control valve 32 may be a micro-notch V-ball control valve.

Neutralizing agent reservoir 34 and an initial dispersion medium reservoir 36, each of which includes a pump (not shown), may also be provided. Desired amounts of neutralizing agent and initial dispersion medium are provided from the neutralizing agent reservoir 34 and the initial water reservoir 36, respectively.

Polymer resin(s), in the form of pellets, powder, or flakes, for example, may be fed from the feeder 37 to an inlet 38 of the extruder 30. The dispersing agent is typically added to the extruder through and along with the resin but may be provided separately to the twin screw extruder 30. The polymer and dispersing agent are then melted, mixed, and conveyed by screws 40 in mix and convey zone 42.

The resin melt is then delivered from the mix and convey zone to a high internal phase emulsion creation zone 43 (referred to herein as the "HIPE zone") of the extruder. In the HIPE zone, an initial amount of dispersion medium and neutralizing agent from the reservoirs 34 and 36 is added through inlet 44.

In the RIPE zone 43, the dispersion particle size is formed, based upon the interfacial chemistry of the mixture components, the mass transfer of the neutralizing agent, and the distributive and dispersive mixing imparted by the screws 40, including the stress, strain and passage frequency.

The emulsified mixture may be further diluted with additional dispersion medium via one or more of inlet 46, 47, 48 from reservoir 50 in dilution zone 52 of the extruder 30. Typically, the dispersion is diluted to at least 30 weight percent dispersion medium in dilution zone 52. In dilution zone 52, the packing fraction of the dispersion particles and the viscosity of the mixture are reduced. For example, the viscosity may be reduced from a magnitude of about $10^6$ to about $10^2$ centipoise.

A cooling zone 54 may be located toward the end of screw 40, near the outlet of extruder 30. Cooling zone 54, providing heat exchange between the dispersion mixture and a cooling medium, not shown, may be used to cool the dispersion mixture to a temperature below that of the boiling point of the dispersion medium. For example, where the dispersion medium is water, the dispersion mixture may be cooled to a temperature below about 100° C. The reduction in dispersion mixture temperature may allow further processing of the mixture without unwanted loss of dispersion medium through evaporation.

The cooled dispersion may then exit extruder 30 via outlet 56. Outlet 56 may be coupled to control valve 32, as described above, to maintain extruder discharge pressure control.

Regarding screws 40 and the internals of extruder 30, one or more rotating restriction orifices 58 may be located along screw 40 in some embodiments. In addition to control valve 32, rotating restriction orifices 58 may improve stability of the dispersion forming process. In other embodiments, non-rotating restriction orifices, not shown, may be used.

Screws 40 may also include high-mixing kneading disks 60 in some embodiments. In addition to the high-mixing kneading disks 60 described above, embodiments of the extrusion apparatus disclosed herein may also include low free volume kneading disks 62, which may minimize the volume weighted particle size distribution of dispersions formed using extruder 30.

In other embodiments of the extrusion apparatus, the reverse elements may be removed, preventing unwanted back mixing. Additionally, the melt seal may be located directly upstream of the HIPE zone in some embodiments.

Figure 2:
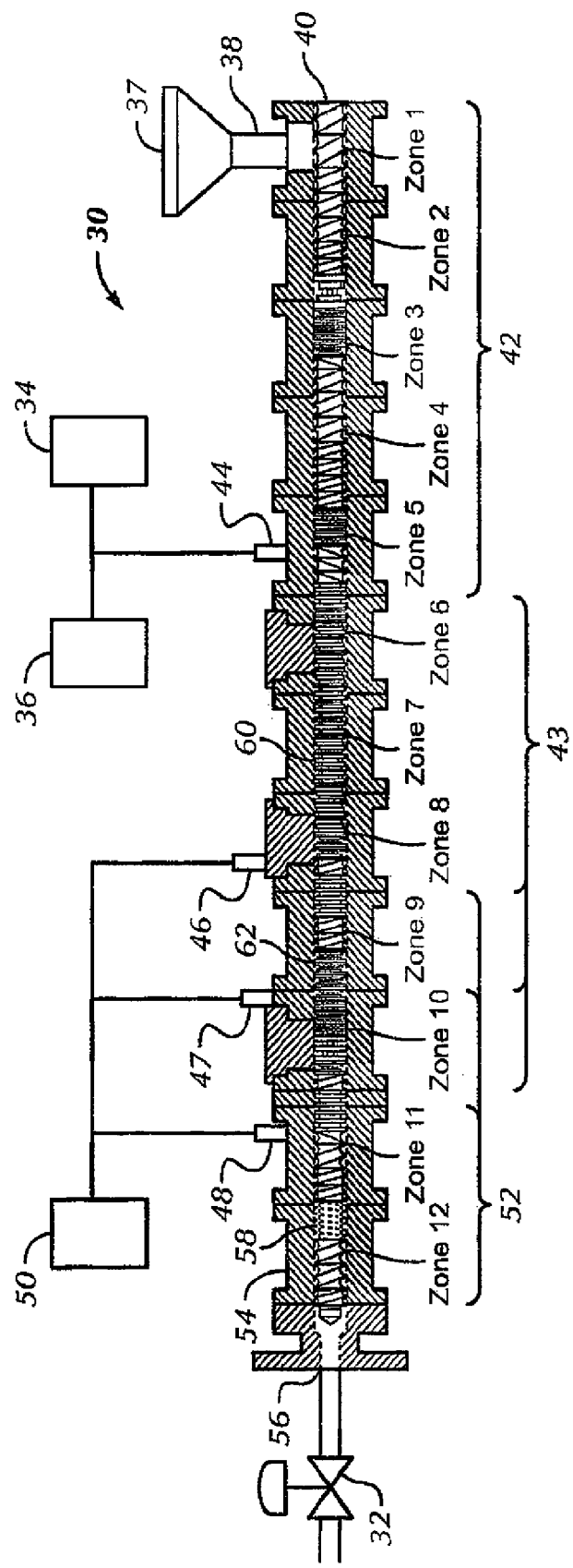
FIG. 2 is a schematic representation of a typical melt-extrusion apparatus used to prepare embodiments of the dispersions disclosed herein, according to embodiments of the invention.

As illustrated in FIG. 2, HIPE zone 43 may be variable in length. Depending upon the feed composition (such as the polymer, dispersing agent, neutralizing agent, etc.), it may be desirable to have a longer or a shorter HIPE zone. Multiple dispersion medium injection points 46, 47, 48 may be provided to allow the HIPE zone to be extended or shortened as needed. As the particle size of the dispersed polymer particles is formed in the HIPE zone, adequate mixing should be provided to develop the desired particle size. Having a variable length for the HIPE zone may allow for a broader range of polymers to be processed in a single extruder, providing for process flexibility, among other benefits.

For example, the twin screw extruder barrels, screws, and dilution medium injection points may such that the length to diameter (L/D) of the HIPE zone is at least 20 when producing fatty acid dispersions and that the L/D of the HIPE zone is at least 16 when producing EEA dispersions. Additionally, the twin screw extruder barrels, screws, and dilution medium injection points may such that the 1st dilution zone L/D is at least 4 when producing fatty acid dispersions and that the 1st dilution zone L/D is at least 8 when producing EEA dispersions.

The apparatuses described above may be used to produce dispersions, where, in some embodiments, the polymer feed rate may range from about 50 to about 2000 lb/h (about 22 to about 907 kg/h). In other embodiments, the polymer feed rate may range from about 100 to about 1000 lb/h (between about 45 and about 454 kg/h).

In other embodiments, the screw speed may range from about 300 rpm to about 1200 rpm. In yet other embodiments, the extruder discharge pressure may be maintained at a pressure ranging from about 300 to about 800 psig (from about 21 bar to about 56 bar).

The above described extrusion apparatus may be used to form polymer dispersions. The polymer dispersions may be formed from any thermoplastic polymer in some embodiments, polyolefins in other embodiments, and ethylene-based polymers or propylene-based polymers in other embodiments. In select embodiments, the extrusion apparatus may be useful for forming aqueous dispersions of polyolefins, including ethylene-based and propylene-based polymers, copolymers, interpolymers, and multi-block interpolymers.

Polyolefin dispersions, in particular, when applied to a substrate, may provide for water and chemical resistance, heat sealability, adhesion to polyolefin substrates, low temperature flexibility. Additionally, the wide range of polyolefins may provide raw materials for producing dispersions and coatings having a wide range of hardness and heat resistance. Also, most polyolefins are compliant with various regulations allowing for direct food contact.

The process for forming polyolefin dispersions described above may be integrated with various downstream processes, such as foaming and spray drying, to create foams, films, coatings, powders, and other value added products. Additionally, the dispersions may provide some synergy with other polyolefin system components, such as fibers and films.

In particular embodiments, it may be desired to utilize the dispersion in the form of foam. When preparing foams, it is often preferred to froth the dispersion. For example, froths and foams may be prepared as described in WO2005/021622, which is fully incorporated herein by reference. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed dispersion, it is preferred to mix all components and then blend the air or gas into the mixture, using equipment such as an OAKES, MONDO, or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers may include, for example, sulfates, succinamates, and sulfosuccinamates.

EXAMPLES

To test the dispersibility of higher crystallinity polyolefins, a number of dispersions are formulated, and their performance measured. As an initial test, seven dispersions, using EAA as the stabilizing agent are formed. Specifically, 70/30 polymer/stabilizing agent blends are formed, using thermoplastic ethylene/acrylic acid copolymer with an acrylic acid content of 20.5 wt %, a density of about 0.958 g/cm$^3$ (ASTM D-792) and a melt index of 13.5 g/10 min. (as determined according to ASTM D1238 at 125° C. and 2.16 kg) a Mw/Mn of about 3.7, and a melting point of about 77° C. (as determined by DSC at a scanning rate of about 10° C. per minute), commercially available as PRIMACOR 59801 (available from The Dow Chemical Company, Midland, Mich.), as the stabilizing agent.

As base polymers, AFFINITY EG8150G (density of 0.868 g/cc, MI of 0.5 g/10 min.), AFFINITY EG8100G (density of 0.870 glee, MI of 1 g/10 min.), AFFINITY PL1280G (density of 0.900 g/cc, MI of 6.00), DOWLEX 2035 (density of 0.919 g/cc, MI of 6 g/10 min), DOWLEX 2027G (density of 0.941 g/cc, MI of 4 g/10 min.), ethylene/1-hexene copolymer DMDA-8907 (density of 0.952 g/cc, MI of 6.8 g/10 min.), and ethylene/homopolymer DMDA-8007 (density of 0.965 g/cc, MI of 8.3 g/10 min), all commercially available from Union Carbide Corp. and/or The Dow Chemical Company, Midland, Mich., are used.

The conditions for making the seven formulations are listed in Table 1 below.

TABLE 1

| Formulation | 1 | 2 | 3 | 4 | 5 | 6 | 7 |
|---|---|---|---|---|---|---|---|
| Base Polymer | AFFINITY EG8150G | AFFINITY EG8100G | AFFINITY PL1280G | DOWLEX 2035 | DOWLEX 2027G | DMDA-8907 | DMDA-8007 |
| Stabilizing Agent | PRIMACOR 59801 | PRIMACOR 59801 | PRIMACOR 59801 | PRIMACOR 59801 | PRIMACOR 59801 | PRIMACOR 59801 | PRIMACOR 59801 |

TABLE 1-continued

| Formulation | 1 | 2 | 3 | 4 | 5 | 6 | 7 |
|---|---|---|---|---|---|---|---|
| Neutralizing Agent & Concentration | KOH @30% w/v | KOH @30% w/v | KOH @30% w/v | KOH @30% w/v | KOH @30% w/v | KOH @30% w/v | KOH @30% w/v |
| 500 #/Hr Feeder Rate lb/hr | 280 | 280 | 280 | 280 | 280 | 280 | 280 |
| 200 #/Hr Feeder Rate lb/hr | 120 | 120 | 120 | 120 | 120 | 120 | 120 |
| Base Pump lb/hr | 67 | 66 | 67 | 66 | 67 | 67 | 67 |
| IA Water lb/hr | 67 | 67 | 67 | 67 | 67 | 68 | 67 |
| $1^{st}$ Dilution lb/hr | 305 | 304 | 304 | 302 | 305 | 307 | 306 |
| $2^{nd}$ Dilution lb/hr | 145 | 145 | 145 | 145 | 145 | 145 | 145 |
| Total Feed Rate lb/hr | 985. | 984 | 984 | 981 | 985 | 987 | 986 |
| Weight & AA in Polymer % | 20 | 20 | 20 | 20 | 20 | 20 | 20 |
| MW of AA g/gmole | 72 | 72 | 72 | 72 | 72 | 72 | 72 |
| MW of Base g/gmole | 56 | 56 | 56 | 56 | 56 | 56 | 56 |
| Calc. HIPE solids content % w/w | 78 | 78 | 78 | 78 | 78 | 78 | 78. |
| Calc. $1^{st}$ dil. solids content % w/w | 42 | 42 | 42 | 42 | 42 | 42 | 42 |
| Calc. degree of neutralization % | 88 | 87 | 87 | 86 | 88 | 87 | 87 |
| ZSK motor current, amps | 149 | 151 | 137 | 142 | 148 | 145 | 143 |
| ZSK motor speed, rpm | 1180 | 1180 | 1180 | 1180 | 1180 | 1180 | 1180 |
| ZSK Ind. Disc Temp ° C. | 92 | 88 | 84 | 83 | 84 | 86 | 86. |
| Actual suction pressure, psig | 397 | 405 | 410 | 424 | 394 | 385 | 410 |
| Cooler discharge temp ° C. | 37 | 37 | 35 | 37 | 36 | 39 | 42 |
| Initial Water Temp ° C. | 117 | 117 | 117 | 117 | 117 | 117 | 117 |
| Initial Water Pressure ° C. | 614 | 602 | 528 | 549 | 574 | 529 | 550 |
| $1^{st}$ Dilution pressure, psig | 387 | 397 | 399 | 416 | 382 | 363 | 398 |
| $1^{st}$ Dilution Temp ° C. | 110 | 110 | 110 | 109 | 108 | 107 | 106 |

The dispersion formulations noted above are manufactured using an extrusion apparatus similar to that illustrated in FIG. 2. The barrel/zone temperature control conditions for the seven formulations are given in Table 2 below.

TABLE 2

| Barrel/Zone Temp Control ° C. | Formulation | | | | | | | |
|---|---|---|---|---|---|---|---|---|
| | 1 | | 2 | | 3 | | 4 | |
| | Setpoint | Actual | Setpoint | Actual | Setpoint | Actual | Setpoint | Actual |
| Zone 1 | | 22 | | 21 | | 20 | | 20 |
| Zone 2 | 100 | 91 | 100 | 89 | 100 | 89 | 100 | 90 |
| Zone 3 | 150 | 152 | 150 | 151 | 150 | 153 | 150 | 151 |
| Zone 4 | 150 | 167 | 150 | 164 | 150 | 152 | 150 | 153 |
| Zone 5 | 180 | 205 | 180 | 196 | 180 | 180 | 180 | 185 |
| Zone 6 | 200 | 199 | 200 | 202 | 200 | 204 | 200 | 205 |
| Zone 7 | 200 | 201 | 200 | 197 | 200 | 191 | 200 | 197 |
| Zone 8 | 150 | 166 | 150 | 163 | 150 | 153 | 150 | 154 |
| Zone 9 | 70 | 132 | 70 | 129 | 70 | 125 | 70 | 127 |

TABLE 2-continued

| | | | | | | | | |
|---|---|---|---|---|---|---|---|---|
| Zone 10 | 70 | 116 | 70 | 114 | 70 | 110 | 70 | 111 |
| Zone 11 | 70 | 83 | 70 | 82 | 70 | 78 | 70 | 80 |
| Zone 12 | 70 | 73 | 70 | 72 | 70 | 71 | 70 | 71 |
| Transition Piece ° C. | 70 | 69 | 70 | 76 | 70 | 75 | 70 | 69 |
| Diverter Valve ° C. | 100 | 99 | 100 | 101 | 100 | 110 | 100 | 101 |

| Barrel/Zone | Formulation | | | | | |
|---|---|---|---|---|---|---|
| Temp | 5 | | 6 | | 7 | |
| Control ° C. | Setpoint | Actual | Setpoint | Actual | Setpoint | Actual |
| Zone 1 | | 19 | | 19 | | 20 |
| Zone 2 | 100 | 87 | 100 | 88 | 100 | 98 |
| Zone 3 | 150 | 150 | 150 | 149 | 150 | 150 |
| Zone 4 | 150 | 161 | 150 | 157 | 150 | 152 |
| Zone 5 | 180 | 179 | 180 | 184 | 180 | 176 |
| Zone 6 | 200 | 203 | 200 | 205 | 200 | 204 |
| Zone 7 | 200 | 203 | 200 | 195 | 200 | 202 |
| Zone 8 | 150 | 162 | 150 | 156 | 150 | 153 |
| Zone 9 | 70 | 129 | 70 | 126 | 70 | 121 |
| Zone 10 | 70 | 114 | 70 | 112 | 70 | 107 |
| Zone 11 | 70 | 81 | 70 | 81 | 70 | 80 |
| Zone 12 | 70 | 72 | 70 | 74 | 70 | 74 |
| Transition Piece ° C. | 70 | 76 | 70 | 69 | 70 | 77 |
| Diverter Valve ° C. | 100 | 109 | 100 | 99 | 100 | 110 |

The end results of the seven formulations are shown in Table 3 below.

TABLE 3

| Formulation | 1 | 2 | 3 | 4 | 5 | 6 | 7 |
|---|---|---|---|---|---|---|---|
| Base Polymer | AFFINITY EG8150G | AFFINITY EG8100G | AFFINITY PL1280G | DOWLEX 2035 | DOWLEX 2027G | DMDA-8907 | DMDA-8007 |
| Polymer Density (g/cc) | 0.868 | 0.870 | 0.900 | 0.919 | 0.941 | 0.952 | 0.965 |
| Polymer MI dg/min | 0.50 | 1.00 | 6.00 | 6.00 | 4.00 | 6.80 | 8.30 |
| Volume Mean Particle Size (microns) | 2.5 | 1.8 | 1.0 | 1.0 | 1.2 | 1.0 | 0.9 |
| Solids Content % w/w | 47.2 | 46.6 | 41.9 | 41.4 | 41.4 | 41.4 | 41.5 |
| Viscosity cP | 157 | 179 | 135 | 116 | 104 | 112 | 120 |
| pH | 9.9 | 10.1 | 9.8 | 10.1 | 10.2 | 10.2 | 10.3 |
| Yellowness Index | 1.7 | 1.4 | 1.2 | 1.2 | 1.3 | 0.9 | 0.7 |
| Filterable Residue % w/w | 0.0142 | 0.0046 | 0.0076 | 0.0028 | 0.0018 | 0.0020 | 0.0044 |

Example 8

To prepare the dispersion, 100 parts by weight of a high density polyethylene homopolymer, available from The Dow Chemical Company under the name HDPE 30460M, with a melt index of about 30 g/10 minutes as determined according to ASTM D-1238 at 190° C. and 2.16 kg and a DSC melting point of about 130° C. (as determined by DSC at a scanning rate of about 10° C. per minute) is melt kneaded at 145° C. in a twin screw extruder at a rate of 4.5 kg/hr along with 6.4 parts of a synthetic C26 mean carboxylic acid available from Baker Petrolite under the tradename of UNICID 350.

Upon the melt kneaded product above, 4.6 parts by weight of an aqueous solution of 19 weight percent potassium hydroxide is continuously fed into a downstream injection port at a rate of 0.2 kg/hr (at a rate of 4.1 weight percent of the total mixture). This aqueous dispersion is subsequently diluted with additional water at a rate of 17 kg/hr before exiting the extruder. This aqueous dispersion having a solids content of 21.9 weight percent at pH 12.2 is obtained with a Brookfield viscosity of <75 cP (RV1 spindle, 22° C., 20 rpm). The dispersed particle size as measured with a Coulter LS230 light scattering instrument is 1.12 micron.

Example 9

To prepare the dispersion, 100 parts by weight of a random polypropylene copolymer, available from The Dow Chemical Company under the name DOW 6D43 Polypropylene Resin, with a melt flow rate of about 35 g/10 minutes as determined according to ASTM D-1238 at 230° C. and 2.16 kg and a DSC melting point of about 140° C. (as determined by DSC at a scanning rate of about 10° C. per minute) is melt kneaded at 165° C. in a twin screw extruder at a rate of 4.5 kg/hr along with 6.4 parts of a synthetic C26 mean carboxylic acid available from Baker Petrolite under the tradename of UNICID 350.

Upon the melt kneaded product above, 4.8 parts by weight of an aqueous solution of 16 weight percent potassium hydroxide is continuously fed into a downstream injection port at a rate of 0.2 kg/hr (at a rate of 4.3 weight percent of the total mixture). This aqueous dispersion is subsequently diluted with additional water at a rate of 7.2 kg/hr before exiting the extruder. This aqueous dispersion having a solids content of 34.8 weight percent at pH 11.8 is obtained with a Brookfield viscosity of <75 cP (RV1 spindle, 22° C., 20 rpm). The dispersed particle size as measured with a Coulter LS230 light scattering instrument is 0.61 micron.

Example 10

To prepare the dispersion, 100 parts by weight of a random polypropylene copolymer, available from The Dow Chemical Company under the name DOW 6D43 Polypropylene Resin, with a melt flow rate of about 35 g/10 minutes as determined according to ASTM D-1238 at 230° C. and 2.16 kg and a DSC melting point of about 140° C. (as determined by DSC at a scanning rate of about 10° C. per minute) is melt kneaded at 175° C. in a twin screw extruder at a rate of 4.5 kg/hr along with 42.8 parts by weight of a thermoplastic ethylene/acrylic acid copolymer with an acrylic acid content of 20.5 wt %, a density of about 0.958 g/cm$^3$ (ASTM D-792) and a melt index of 300 g/10 min. (as determined according to ASTM D1238 at 190° C. and 2.16 kg) and a melting point of about 77° C. (as determined by DSC at a scanning rate of about 10° C. per minute), commercially available from The Dow Chemical Company.

Upon the melt kneaded product above, 38.1 parts by weight of an aqueous solution of 14 weight percent potassium hydroxide is continuously fed into a downstream injection port at a rate of 1.7 kg/hr (at a rate of 21.0 weight percent of the total mixture). This aqueous dispersion is subsequently diluted with additional water at a rate of 8.9 kg/hr before exiting the extruder. This aqueous dispersion having a solids content of 39.4 weight percent at pH 11.1 is obtained with a Brookfield viscosity of 140 eP (RVI spindle, 22° C., 20 rpm). The dispersed particle size as measured with a Coulter LS230 light scattering instrument is 0.97 micron.

Extruder Examples

Dispersions similar to those of Examples 1-7 above, are produced using an extruder apparatus similar to that illustrated in FIG. 2. The extruder apparatus includes a self-cleaning micro-notch V-ball control valve, rotating restriction orifices, and the above-described high-mixing kneading disks. For comparative purposes, extruder operations are compared to an unmodified extruder apparatus having a back pressure regulator at the exit of the extruder for pressure control, similar to that illustrated in FIG. 1. The two extruder apparatuses have similar L/D's for both the emulsification zone or HIPE zone and the first dilution zone.

Figure 3A:
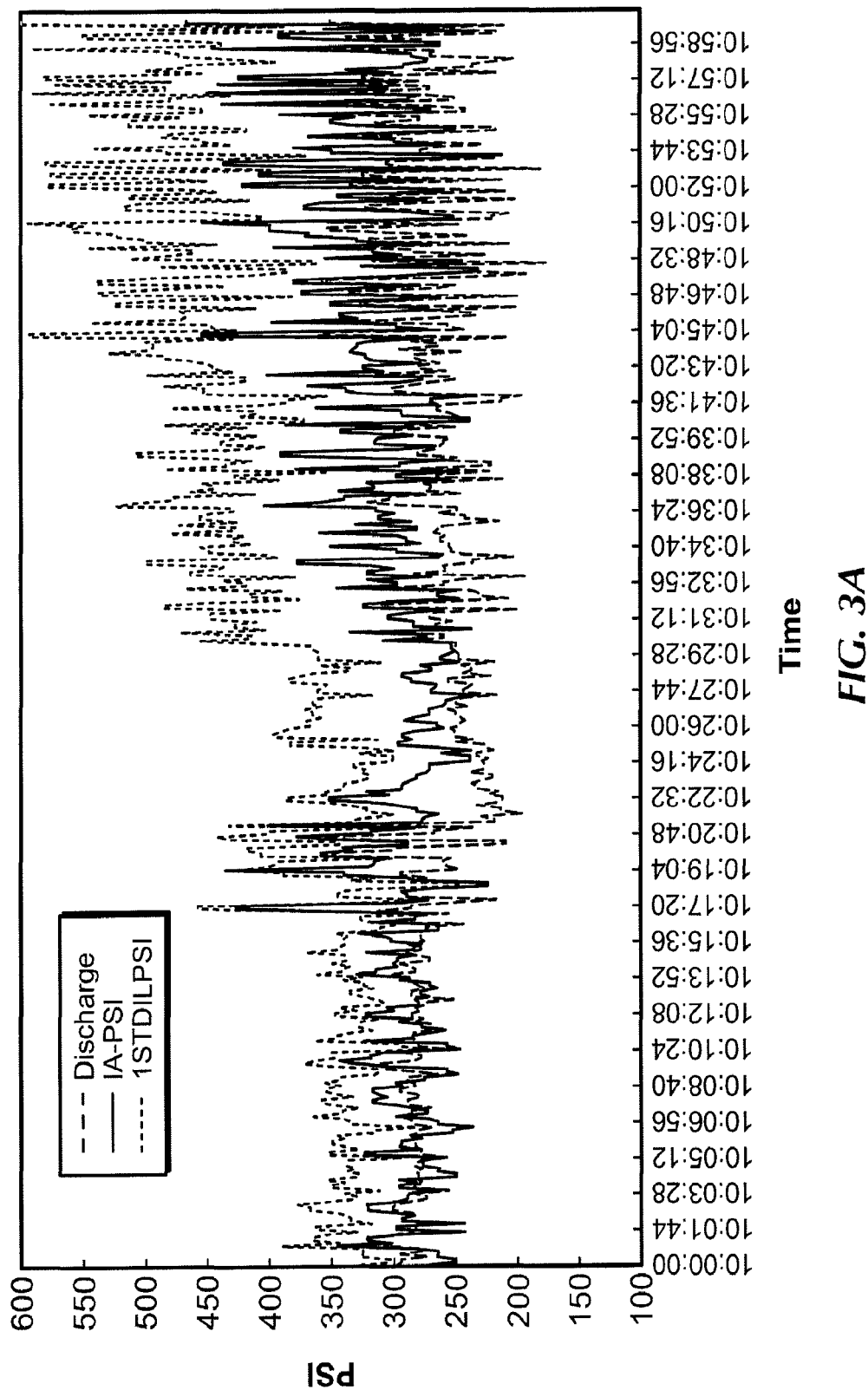
FIG. 3A is a chart illustrating the performance of an unmodified melt extrusion device, similar to that of FIG. 1, graphically depicting extruder operating pressures over time.
Figure 3B:
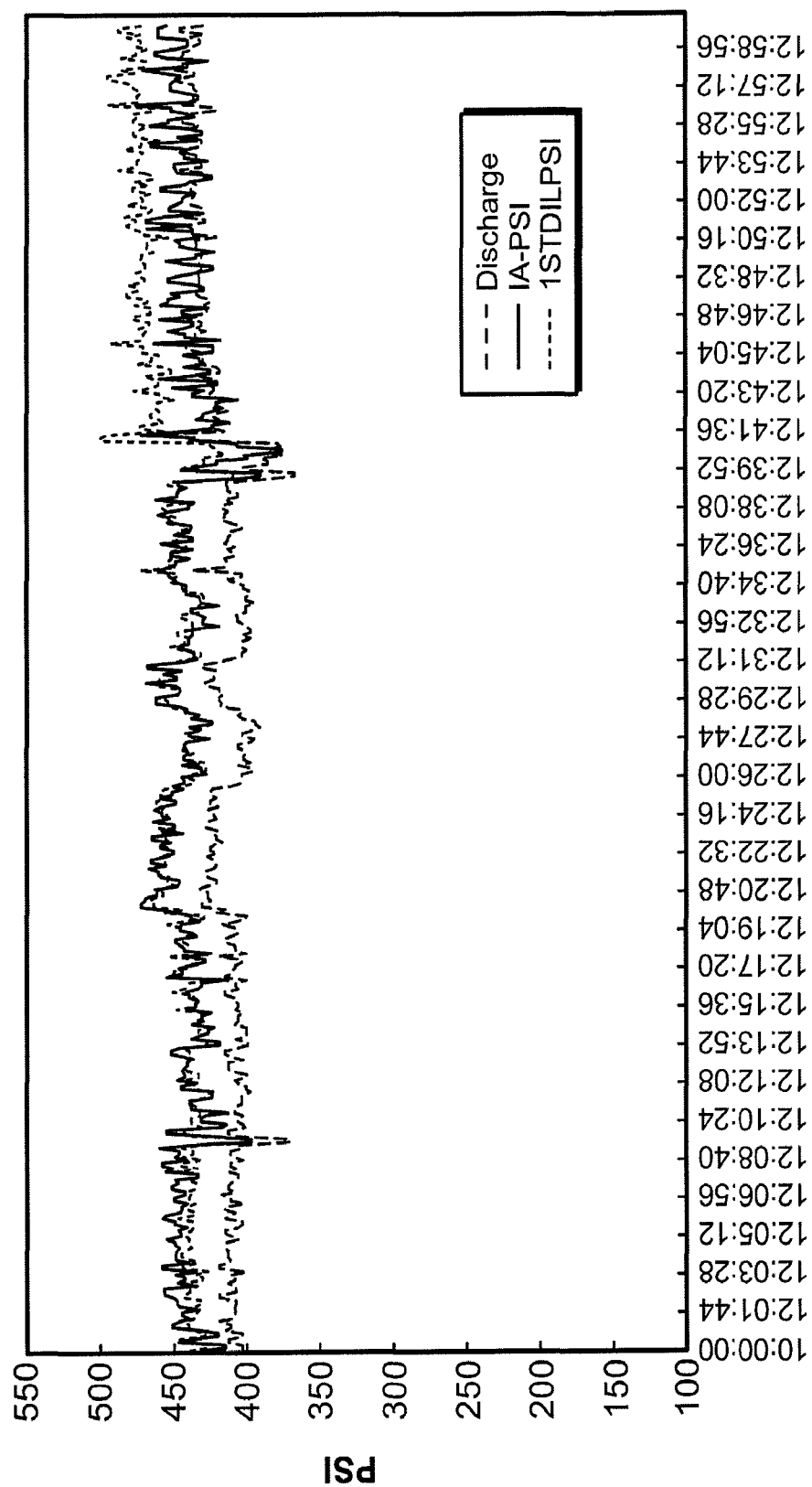
FIG. 3B is a chart illustrating the performance of a modified melt extrusion device according to embodiments disclosed herein, similar to that of FIG. 2, graphically depicting extruder operating pressures over time.

Comparison of the extruder operations indicates that operation of the modified extruder apparatus (FIG. 2) is much improved compared to the unmodified extruder apparatus. Comparing FIGS. 3a and 3b, the variance in extruder discharge pressure (DISCHARGE), neutralizing agent addition pressure (IA-PSI), and first dilution zone pressure (1STDILPSI) are each decreased for the modified extruder apparatus, indicative of improved process stability.

Figure 4:
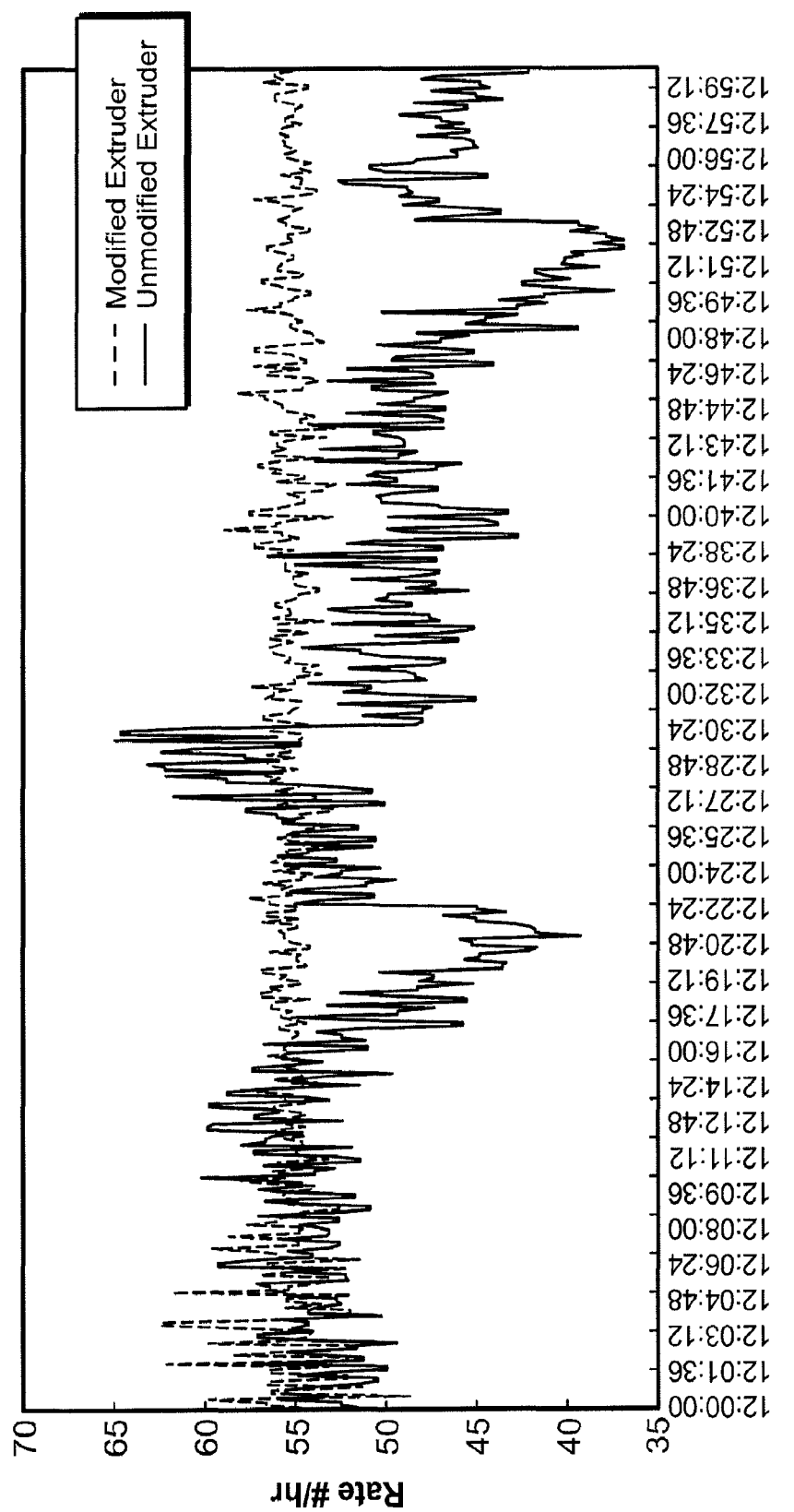
FIG. 4 is a chart comparing neutralizing agent feed rates for an unmodified extrusion apparatus and a modified extrusion apparatuses according to embodiments disclosed herein.

The improved process stability achieved through use of one or more of the V-ball control valve, the high-mixing kneading disks, and the rotating restriction orifices may result in a more consistent dispersion product. For example, the feed rate of neutralizing agent may be more consistent, as illustrated in FIG. 4, due to the improved extruder pressure control obtained via one or more of the noted modifications.

Higher crystallinity polyolefin foams formed from the dispersion of higher crystallinity polyolefins may have a number of useful properties. Modified foams are also within the purview of this invention and may include micro-cavity containing thermoplastic foams such as those disclosed in U.S. Provisional Application Ser. No. 60/700,644. The micro-cavity containing additives include such materials as super absorbent polymers (SAP) for articles such as infant and children diapers, adult incontinence pants, feminine hygiene pads, household cleaning articles, pet urine absorption mats/pads, and garbage bag liquid absorbent pads.

Advantageously, the present invention provides for aqueous dispersions of higher crystallinity polyolefin. Coatings and articles produced from dispersions disclosed herein may advantageously have a higher heat resistance, a greater resistance to compression set at elevated temperatures, and may exhibit a broader operating window in various extrusion and molding process.

These dispersions may be used as coatings and as articles such as foams. Alternative uses for these dispersions include adhesives for bonding and sealing various substrates, especially corrugated boxes and plastics films such as biaxially oriented polypropylene (BOPP), polyester and polyamide films. Additionally, these foams may be used in the construction of diapers and feminine hygiene pads as the liquid absorbent and distribution layer. Today, such diapers and feminine hygiene pads are packaged tightly. Foams formed from dispersions disclosed herein may provide significantly lower compression set at 40° C., allowing near full recovery of the original foam thickness, a requirement for the end product.

In another aspect, dispersions made using higher crystallinity polyolefins may be used as a coating or adhesive where heat resistance is required. Many automotive applications require heat resistance at temperatures of 60° C. and higher.

In addition to the mechanical emulsification of a higher crystallinity polyolefin dispersion, blends of different higher crystallinity polyolefins and blends of higher crystallinity polyolefins and other polyolefins and plastics may be produced to enhance certain properties such as adhesion to specific substrates such as paper or glass and heat resistance, improve the abrasion resistance of polyolefin films, and allow the deposition of harder materials on a substrate.

In another embodiment of the present invention, a dispersion of higher crystallinity polyolefins may be used in connection with other dispersions to form a blended dispersion product.

In addition to the applications described above, higher crystallinity polyolefin dispersions described herein may be useful in a number of other applications.

Accordingly, in one application, dispersions of higher crystallinity polyolefins may be useful in cellulose-based articles, especially having a specific volume of less than 3 cc/gm, for example, paper and board structures, incorporating a compound comprising an aqueous polyolefin dispersion resulting in articles having improved properties. In various embodiments, the articles may have improved oil and grease resistance, improved water resistance, controlled coefficients of friction, thermal embossability, thermal formability, improved wet and dry strength, or an improved softness, among others. Such techniques and compositions are disclosed in U.S. Application Ser. No. 60/750,466, which is expressly incorporated by reference in its entirety.

Thus, in one application, dispersions of higher crystallinity polyolefins may be useful in providing a cellulose-based article having, especially those having a specific volume of less than 3 cc/gm, including: a cellulose-based composition; and an applied compound. The applied compound, at the time of application, may include a higher crystallinity polyolefin and at least one dispersing agent. The article may have an oil and grease resistance value of at least 9 as measured using the Kit test at an exposure time of 15 seconds.

Thus, in one application, dispersions of catalytic linear multi-block olefins may be useful in providing a cellulose-based article, especially those having a specific volume of less than 3 cc/gm, including: a cellulose-based composition; and an applied compound. The applied compound, at the time of application, may include a higher crystallinity polyolefin, and at least one dispersing agent. The cellulose-based article may have a water resistance value of less than about 10 $g/m^2/120$ seconds as measured via the Cobb test.

The Kit test: the kit value of samples may be determined using TAPPI T559cm-02. The test was performed flat as described in the TAPPI test. This involves putting five separate drops of oil onto the board's surface and inspecting the board after a specified amount of exposure time (15 seconds) to see if any pronounced darkening of the paper appears. A modified Kit test run at elevated temperature(s) can be useful to distinguish deposited dispersions made using the catalytic linear multi-block polymers, especially for ethylene based block polymers versus other ethylene based random copolymers. Such elevated temperatures for testing can be as high as about 80° C., but preferably tested around 50° C. Film layers made using deposited dispersions from the catalytic linear ethylenic multi-block polymers show higher Kit values at 50° C. than Kit values (also at 50° C.) for random ethylene polymer based deposited dispersions, even at similar overall ethylene polymer density and melt index.

The Cobb test: Cobb tests may be performed in accordance with ASTM D3285-93. The exposure time was 2 minutes. The test involves a known volume of water (100 ml) being poured onto a specific area of the board's surface (100 $cm^2$). The board is weighed before and after the exposure and the difference between the two can then be expressed as the weight per unit area of water absorbed in that given time; the lower the Cobb value, the better the result. A modified Cobb test run at elevated temperature(s) can be useful to distinguish deposited dispersions made using higher crystallinity polyolefins. Such elevated temperatures for testing can be as high as about 80° C., but preferably tested around 50° C.

Thus, embodiments disclosed herein may relate to cellulose-based compositions, which are generally referred to as "paper and/or paperboard products" (i.e., other than paper towels), such as newsprint, uncoated groundwood, coated groundwood, coated free sheet, uncoated free sheet, packaging and industrial papers, linerboard, corrugating medium, recycled paperboard, bleached paperboard, writing paper, typing paper, photo quality paper, wallpaper, etc. Such compositions can generally be formed in accordance with the present invention from at least one paper web.

For example, in one embodiment, the paper product can contain a single-layered paper web formed from a blend of fibers. In another embodiment, the paper product can contain a multi-layered paper (i.e., stratified) web. Furthermore, the paper product can also be a single- or multi-ply product (e.g., more than one paper web), wherein one or more of the plies may contain a paper web formed according to the present invention. Normally, the basis weight of a paper product of the present invention is between about 10 grams per square meter ($g/m^2$) to about 525 $g/m^2$. Normally, the specific volume of a paper product in accordance with embodiments of the present invention is between about 0.3 glee to about 2 g/cc.

Any of a variety of materials can be used to form the paper products of the present invention. For example, the material used to make paper products can include fibers formed by a variety of pulping processes, such as kraft pulp, sulfite pulp, thermomechanical pulp, etc.

Papermaking fibers useful in the process of the present invention include any cellulosic fibers that are known to be useful for making cellulosic base sheets. Suitable fibers include virgin softwood and hardwood fibers along with non-woody fibers, as well as secondary (i.e., recycled) papermaking fibers and mixtures thereof in all proportions. Non-cellulosic synthetic fibers can also be included in the aqueous suspension. Papermaking fibers may be derived from wood using any known pulping process, including kraft and sulfite chemical pulps.

Fibers suitable for making paper webs comprise any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. Fibers prepared from organosols pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104. Useful fibers can also be produced by anthraquinone pulping, exemplified by U.S. Pat. No. 5,595,628 issued Jan. 21, 1997, to Gordon et al.

In one embodiment, a portion of the fibers, such as up to 50% or less by dry weight, or from about 5% to about 30% by dry weight, can be synthetic fibers such as rayon, polyolefin fibers, polyester fibers, bicomponent sheath-core fibers, multi-component binder fibers, and the like. An exemplary polyethylene fiber is PULPEX®, available from Hercules, Inc. (Wilmington, DE). Any known bleaching method can be used. Synthetic cellulose fiber types include rayon in all its varieties and other fibers derived from viscose or chemically-modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof In certain embodiments capable of high bulk and good compressive properties, the fibers can have a Canadian Standard Freeness of at least 200, more specifically at least 300, more specifically still at least 400, and most specifically at least 500. In some other embodiments, portions of the fibers up to about 90% by dry weight may be synthetic fibers.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In some embodiments, the pulp fibers may include softwood fibers having an average fiber length of greater than 1 mm and particularly from about 2 mm to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and the like. Exemplary commercially available pulp fibers suitable for the present invention include those available from Neenah Paper Inc. under the trade designations "LONGLAC-19."

In some embodiments, hardwood fibers, such as eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the paper to increase the wicking ability of the paper web. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and the like. In addition, in some instances, synthetic fibers can also be utilized. Some suitable synthetic fibers can include, but are not limited to, rayon fibers, ethylene vinyl alcohol copolymer fibers, polyolefin fibers, polyesters, and the like.

As stated, the paper product of the present invention can be formed from one or more paper webs. The paper webs can be single-layered or multi-layered. For instance, in one embodiment, the paper product contains a single-layered paper web layer that is formed from a blend of fibers. For example, in some instances, eucalyptus and softwood fibers can be homogeneously blended to form the single-layered paper web.

In another embodiment, the paper product can contain a multi-layered paper web that is formed from a stratified pulp furnish having various principal layers. For example, in one embodiment, the paper product contains three layers where one of the outer layers includes eucalyptus fibers, while the other two layers include northern softwood kraft fibers. In another embodiment, one outer layer and the inner layer can contain eucalyptus fibers, while the remaining outer layer can contain northern softwood kraft fibers. If desired, the three principle layers may also include blends of various types of fibers. For example, in one embodiment, one of the outer layers can contain a blend of eucalyptus fibers and northern softwood kraft fibers. However, it should be understood that the multi-layered paper web can include any number of layers and can be made from various types of fibers. For instance, in one embodiment, the multi-layered paper web can be formed from a stratified pulp furnish having only two principal layers.

In accordance with the present invention, various properties of a paper product such as described above, can be optimized. For instance, strength (e.g., wet tensile, dry tensile, tear, etc.), softness, lint level, slough level, and the like, are some examples of properties of the paper product that may be optimized in accordance with the present invention. However, it should be understood that each of the properties mentioned above need not be optimized in every instance. For example, in certain applications, it may be desired to form a paper product that has increased strength without regard to softness.

In this regard, in one embodiment of the present invention, at least a portion of the fibers of the paper product can be treated with hydrolytic enzymes to increase strength and reduce lint. In particular, the hydrolytic enzymes can randomly react with the cellulose chains at or near the surface of the papermaking fibers to create single aldehyde groups on the fiber surface which are part of the fiber. These aldehyde groups become sites for cross-linking with exposed hydroxyl groups of other fibers when the fibers are formed and dried into sheets, thus increasing sheet strength. In addition, by randomly cutting or hydrolyzing the fiber cellulose predominantly at or near the surface of the fiber, degradation of the interior of the fiber cell wall is avoided or minimized. Consequently, a paper product made from these fibers alone, or made from blends of these fibers with untreated pulp fibers, show an increase in strength properties such as dry tensile, wet tensile, tear, etc.

Other examples of useful cellulose-based compositions useful in the present invention include those disclosed in U.S. Pat. Nos. 6,837,970, 6,824,650, 6,863,940 and in U.S. Patent Application Publication Nos. US20050192402 and 20040149412, each of which is incorporated herein by reference. Cellulosic webs prepared in accordance with the present invention can be used for a wide variety of applications, such as paper and paperboard products (i.e., other than paper towels), newsprint, uncoated groundwood, coated groundwood, coated free sheet, uncoated free sheet, packaging and industrial papers, linerboard, corrugating medium, recycled paperboard, and bleached paperboard. Webs made according to the present invention can be used in diapers, sanitary napkins, composite materials, molded paper products, paper cups, paper plates, and the like. Materials prepared according to the present invention can also be used in various textile applications, particularly in textile webs comprising a blend of cellulosic materials and wool, nylon, silk or other polyamide or protein-based fibers.

The paper products may contain a variety of fiber types both natural and synthetic. In one embodiment the paper products comprises hardwood and softwood fibers. The overall ratio of hardwood pulp fibers to softwood pulp fibers within the product, including individual sheets making up the product may vary broadly. The ratio of hardwood pulp fibers to softwood pulp fibers may range from about 9:1 to about 1:9, more specifically from about 9:1 to about 1:4, and most specifically from about 9:1 to about 1:1. In one embodiment of the present invention, the hardwood pulp fibers and softwood pulp fibers may be blended prior to forming the paper sheet thereby producing a homogenous distribution of hardwood pulp fibers and softwood pulp fibers in the z-direction of the sheet. In another embodiment of the present invention, the hardwood pulp fibers and softwood pulp fibers may be layered so as to give a heterogeneous distribution of hardwood pulp fibers and softwood pulp fibers in the z-direction of the sheet. In another embodiment, the hardwood pulp fibers may be located in at least one of the outer layers of the paper product and/or sheets wherein at least one of the inner layers may comprise softwood pulp fibers. In still another embodiment the paper product contains secondary or recycled fibers optionally containing virgin or synthetic fibers.

In addition, synthetic fibers may also be utilized in the present invention. The discussion herein regarding pulp fibers is understood to include synthetic fibers. Some suitable polymers that may be used to form the synthetic fibers include, but are not limited to: polyolefins, such as, polyethylene, polypropylene, polybutylene, and the like; polyesters, such as polyethylene terephthalate, poly(glycolic acid) (PGA), poly (lactic acid) (PLA), poly($\beta$-malic acid) (PMLA), poly($\epsilon$-caprolactone) (PCL), poly(p-dioxanone) (PDS), poly(3-hydroxybutyrate) (PHB), and the like; and, polyamides, such as nylon and the like. Synthetic or natural cellulosic polymers, including but not limited to: cellulosic esters; cellulosic ethers; cellulosic nitrates; cellulosic acetates; cellulosic acetate butyrates; ethyl cellulose; regenerated celluloses, such as viscose, rayon, and the like; cotton; flax; hemp; and mixtures thereof may be used in the present invention. The synthetic fibers may be located in one or all of the layers and sheets comprising the paper product.

Cellulose-based articles can be formed by a variety of processes known to those skilled in the art. Machines may be configured to have a forming section, a press section, a drying section, and depending on the article formed, optionally a reel. Examples of the details of the process steps and schematic illustrations may be found in "Properties of Paper: An Introduction" 2nd edition W. Scott and J. Abbott, TAPPI Press 1995. In a simplified description of the process, typically a dilute suspension of pulp fibers is supplied by a head-box and deposited via a sluice in a uniform dispersion onto a forming fabric of a conventional papermaking machine. The suspension of pulp fibers may be diluted to any consistency which is typically used in conventional papermaking processes. For example, the suspension may contain from about 0.01 percent to about 1.5 percent by weight pulp fibers suspended in water. Water is removed from the suspension of pulp fibers to form a uniform layer of pulp fibers. Other paper-making processes, paper-board manufacturing processes, and the like, may be utilized with the present invention. For example, the processes disclosed in U.S. Pat. No. 6,423,183 may be used.

The pulp fibers may be any high-average fiber length pulp, low-average fiber length pulp, or mixtures of the same. The high-average fiber length pulps typically have an average fiber length from about 1.5 mm to about 6 mm. An exemplary high-average fiber length wood pulp includes one available from the Neenah Paper Inc. under the trade designation LONGLAC 19.

The low-average fiber length pulp may be, for example, certain virgin hardwood pulps and secondary (i.e., recycled) fiber pulp from sources such as, for example, newsprint, reclaimed paperboard, and office waste. The low-average fiber length pulps typically have an average fiber length of less than about 1.2 mm, for example, from 0.7 mm to 1.2 mm.

Mixtures of high-average fiber length and low-average fiber length pulps may contain a significant proportion of low-average fiber length pulps. For example, mixtures may contain more than about 50 percent by weight low-average fiber length pulp and less than about 50 percent by weight high-average fiber length pulp. One exemplary mixture contains 75 percent by weight low-average fiber length pulp and about 25 percent high-average fiber length pulp.

The pulp fibers used in the present invention may be unrefined or may be beaten to various degrees of refinement. Small amounts of wet-strength resins and/or resin binders may be added to improve strength and abrasion resistance. Useful binders and wet-strength resins include, for example, KYMENE 557 H available from the Hercules Chemical Company and PAREZ 631 available from American Cyanamid, Inc. Cross-linking agents and/or hydrating agents may also be added to the pulp mixture. Debonding agents may be added to the pulp mixture to reduce the degree of hydrogen bonding if a very open or loose nonwoven pulp fiber web is desired. One exemplary debonding agent is available from the Quaker Chemical Company, Conshohocken, Pa., under the trade designation QUAKER 2008. The addition of certain debonding agents in the amount of, for example, 1 percent to 4 percent, by weight, of the composite also appears to reduce the measured static and dynamic coefficients of friction and improve the abrasion resistance of the continuous filament rich side of the composite fabric. The de-bonder is believed to act as a lubricant or friction reducer.

When treating paper webs in accordance with the present disclosure, the additive composition containing the higher crystallinity polyolefin dispersion can be applied to the web topically or can be incorporated into the web by being premixed with the fibers that are used to form the web. When applied topically, the additive composition can be applied to the web when the web is wet or dry. In one embodiment, the additive composition may be applied topically to the web during a creping process. For instance, in one embodiment, the additive composition may be sprayed onto the web or onto a heated dryer drum to adhere the web to the dryer drum. The web can then be creped from the dryer drum. When the additive composition is applied to the web and then adhered to the dryer drum, the composition may be uniformly applied over the surface area of the web or may be applied according to a particular pattern.

When topically applied to a paper web, the additive composition may be sprayed onto the web, extruded onto the web, or printed onto the web. When extruded onto the web, any suitable extrusion device may be used, such as a slot-coat extruder or a meltblown dye extruder. When printed onto the web, any suitable printing device may be used. For example, an inkjet printer or a rotogravure printing device may be used.

The dispersion may be incorporated at any point in the paper manufacturing process. The point during the process at which the dispersion is incorporated into the cellulose-based composition may depend upon the desired end properties of the cellulose-based product, as will be detailed later. Incorporation points may include pre-treatment of pulp, co-application in the wet end of the process, post treatment after drying but on the paper machine and topical post treatment. Incorporation of the dispersion of the present invention onto or in the cellulose-based structure may be achieved by any of several methods, as incorporated by reference, and known by those of ordinary skill in the art.

In yet another application, a higher crystallinity polyolefin dispersion formed in accordance with the disclosure, is suitable for impregnating a fibrous structure. In certain cases, a fibrous structure impregnated with such a stiffening composition can provide adequate stiffness, elasticity, resilience, adhesion, and shape retention for use in shoe stiffeners, such as toe boxes, counters, and the like. Suitable techniques for impregnation are disclosed in U.S. patent application Ser. No. 11/300,993, which is expressly incorporated by reference in its entirety.

One skilled in the art will appreciate that a desirable degree or amount of impregnation can range from a partial saturation of the fibrous structure to a complete saturation of the fibrous structure. The desired degree of impregnation can depend upon variables including the nature of the fiber being impregnated and the nature of impregnate, for example. One skilled in the art will also appreciate that the intended end properties of the impregnated structure will influence the selection of the specific ingredients (fibers and dispersions, for example) and processing parameters.

In yet another application, dispersions of higher crystallinity polyolefins may be useful as toner compositions, wherein at least one selected from the group consisting of a colorant and a magnetic pigment is used with the dispersion, and wherein the dispersion has an average volume diameter particle size from about 0.3 to about 8.0 microns. Techniques for formulating such toner compositions are discussed in co-pending, co-assigned, application U.S. Provisional Application Ser. No. 60/779,126 filed on Mar. 3, 2006, which is expressly incorporated by reference in its entirety.

Briefly, after forming the dispersion, at least a portion of the liquid may be removed to form toner particles. In selected embodiments, substantially all of the water may be removed to form base toner particles. In one embodiment, drying of the dispersion may be accomplished by spray drying the dispersion. As is known in the art, spray drying involves the atomization of a liquid feedstock into a spray of droplets and contacting the droplets with hot air in a drying chamber. The sprays are typically produced by either rotary (wheel) or nozzle atomizers. Evaporation of moisture from the droplets and formation of dry particles proceed under controlled temperature and airflow conditions. Powder is discharged substantially continuously from the drying chamber. Operating conditions and dryer design are selected according to the drying characteristics of the product and powder specification.

Thus, in one embodiment, a dispersion may be formed, and shipped to another location, where the dispersion is subjected to a post-treatment process such as spray drying to form a toner powder.

In select embodiments, it is advantageous to add auxiliary fine particles to the base toner particles in order to improve the fluidity, the electrification stability, or the blocking resistance at a high temperature, etc. The auxiliary fine particles to be fixed on the surface of the base toner particles may be suitably selected for use among various inorganic or organic fine particles.

As the inorganic fine particles, various carbides such as silicon carbide, boron carbide, titanium carbide, zirconium carbide, hafnium carbide, vanadium carbide, tantalum carbide, niobium carbide, tungsten carbide, chromium carbide, molybdenum carbide and calcium carbide, various nitrides such as boron nitride, titanium nitride and zirconium nitride, various borides such as zirconium boride, various oxides such as titanium oxide, calcium oxide, magnesium oxide, zinc oxide, copper oxide, aluminum oxide, cerium oxide, silica and colloidal silica, various titanate compounds such as calcium titanate, magnesium titanate and strontium titanate, phosphate compounds such as calcium phosphate, sulfides such as molybdenum disulfide, fluorides such as magnesium fluoride and carbon fluoride, various metal soaps such as aluminum stearate, calcium stearate, zinc stearate and magnesium stearate, talc, bentonite, various carbon black and conductive carbon black, magnetite and ferrite, may, for example, be employed. As the organic fine particles, fine particles of a styrene resin, an acrylic resin, an epoxy resin or a melamine resin, may, for example, be employed.

Among such auxiliary fine particles, silica, titanium oxide, alumina, zinc oxide, various carbon black or conductive carbon black may, for example, be particularly preferably employed. Further, such auxiliary fine particles may include the above mentioned inorganic or organic fine particles, where the surface of the particles is treated by surface treatment such as hydrophobic treatment by a treating agent such as a silane coupling agent, a titanate coupling agent, a silicone oil, a modified silicone oil, a silicone varnish, a fluorinated silane coupling agent, a fluorinated silicone oil or a coupling agent having amino groups or quaternary ammonium bases. Such treating agents may be used in combination as a mixture of two or more of them.

As a method for adding the auxiliary fine particles to the base toner particles, a method is known to add and blend them by means of a high speed stirring machine such as a Henschel mixer. However, in order to improve the blocking resistance at a high temperature, it is preferred to have the auxiliary fine particles fixed on the surface of the base toner particles. In the present invention, fixing means an addition method employing an apparatus capable of exerting a compression sharing stress (hereinafter referred to as a compression shearing treatment apparatus) or an apparatus capable of melting or softening the surface of the base toner particles (hereinafter referred to as a particle surface-melting treatment apparatus). By such fixing treatment, the auxiliary fine particles may be firmly be fixed to the surface of the base toner particles without substantial pulverization of the base toner particles, whereby blocking resistance during the storage at a high temperature may be improved, and it is possible to produce a toner which is less likely to bring about fusion to components of a copying machine or a printer even in a continuous copying operation.

The above-mentioned compression shearing treatment apparatus is constructed to have a narrow clearance defined by a head surface and a head surface, a head surface and a wall surface, or a wall surface and a wall surface, which are mutually mobile while a distance is maintained, so that the particles to be treated are forcibly passed through the clearance, whereby a compression stress and a shearing stress will be exerted to the surface of the particles without substantially pulverizing them. As the compression shearing treatment apparatus to be used, a mechanofusion apparatus manufactured by Hosokawa Micron K.K., may, for example, be mentioned.

The above-mentioned particle surface-melting treatment apparatus is usually constructed so that a mixture of the base toner fine particles and the auxiliary fine particles is instantaneously heated to a temperature of at least the melting-initiation temperature by means of, for example, a hot air stream thereby to have the auxiliary fine particles fixed. As the particle surface-melting treatment apparatus to be used, a surfacing system manufactured by Nippon Neumatic K.K. may be employed.

In yet another application, dispersions using a higher crystallinity polyolefm may be useful as films, adhesives, or other sealing and/or packaging applications. This particular application involves applying a dispersion formulated in accordance with the above disclosure to a substrate. Those having skill in the art will appreciate that any useful substrate may be used. In particular, a wide variety of polymer substrates may be used, and even more particularly, oriented polymers may be used. Such techniques are disclosed for example, in U.S. Patent Application Publication No. 20050271888, which is expressly incorporated by reference in its entirety.

In yet another application, dispersions using a higher crystallinity polyolefin may be useful in forming long fiber-reinforced thermoplastic concentrates. Techniques for forming such concentrates are disclosed in co-pending, co-assigned Ser. No. 60/697,324, which is incorporated by reference in its entirety.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. An aqueous dispersion comprising: at least one higher crystallinity polyolefin, having a crystallinity greater than 50 percent; at least one dispersing agent; and water; and wherein the polyolefin comprises an ethylene homopolymer, an ethylene/α-olefin copolymer, or an ethylene/α-olefin multiblock interpolymer; or combinations thereof.

2. The dispersion of claim 1 where the polyolefin has a weight average molecular weight, $M_w$, of from about 15,000 to about 1,000,000 g/mole.

3. The dispersion of claim 1 comprising a dispersed particulate having an average volume diameter particle size of greater than 0 up to about 10 micrometers.

4. The dispersion of claim 3, comprising a dispersed particulate having an average volume diameter size of 1 to about 5 micrometers.

5. The dispersion of claim 1, comprising a dispersed particulate and having an average solids content of greater than 0 up to about 80 weight percent.

6. The dispersion of claim 5, comprising a dispersed particulate and having an average solids content of about 40 to about 60 weight percent.

7. The dispersion of claim 1, wherein the dispersion has a pH of less than about 12.

8. The dispersion of claim 1, wherein the dispersing agent comprises at least one ethylene/alpha-beta unsaturated carboxylic acid copolymer.

9. The dispersion of claim 8, wherein a polyolefin-to-ethylene/alpha-beta unsaturated carboxylic acid copolymer ratio is between 50:50 to 90:10.

10. he dispersion of claim 1, wherein the dispersing agent comprises a fatty acid.

11. The dispersion of claim 10, wherein a polymer-to-fatty-acid ratio is between 97:3 to 94:6.

12. A toner composition comprising: a particulate made from an aqueous dispersion, the dispersion comprising: a higher crystallinity polyolefin, having a crystallinity greater than 50 percent and wherein the polyolefin comprises an ethylene homopolymer, an ethylene/α-olefin copolymer, or an ethylene/α-olefin multiblock interpolymer; or combinations thereof; and at least one dispersing agent, and at least one selected from the group consisting of a colorant and a magnetic pigment, wherein the dispersion has an average volume diameter particle size from about 0.3 to about 8 microns, wherein the dispersion has at least been partially dried such that the liquid level is at least 50 percent that of the liquid level of the dispersion to form the particulate.

13. A method for forming a layer on a substrate comprising: applying an aqueous dispersion to a substrate, the dispersion comprising: a higher crystallinity polyolefin, having a crystallinity greater than 50 percent and wherein the polyolefin comprises an ethylene homopolymer, an ethylene/α-olefin copolymer, or an ethylene/α-olefin multiblock interpolymer; or combinations thereof; at least one dispersing agent; removing at least a portion of water in the dispersion to form a first layer.

14. The method of claim 13 wherein the substrate comprises at least one oriented polymer.

15. The method of claim 13 where the substrate is selected from the group consisting of fibers, mats, nonwovens, wovens, and fabrics.

16. The method of claim 13 where the substrate is a carpet backing.

17. The method of claim 13 where the substrate is a metal.

* * * * *